(12) United States Patent
Deel et al.

(10) Patent No.: US 11,936,329 B2
(45) Date of Patent: Mar. 19, 2024

(54) MOUNTING SYSTEM FOR MOUNTING A PHOTOVOLTAIC PANEL

(71) Applicant: Preformed Line Products Co., Mayfield Village, OH (US)

(72) Inventors: Adam Deel, Bay Village, OH (US); Benjamin Franklin Ciesielczyk, Madison, OH (US); Randy Cloud, Mentor, OH (US); David Koehler, University Heights, OH (US); Jaanki Thakkar, Parma, OH (US); John B. Markiewicz, Mentor, OH (US); Darius J. Kaunas, Medina, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/554,574

(22) Filed: Dec. 17, 2021

(65) Prior Publication Data

US 2022/0200515 A1    Jun. 23, 2022

Related U.S. Application Data

(60) Provisional application No. 63/127,525, filed on Dec. 18, 2020, provisional application No. 63/127,509, filed on Dec. 18, 2020, provisional application No. 63/127,498, filed on Dec. 18, 2020.

(51) Int. Cl.
| | |
|---|---|
| *H02S 20/10* | (2014.01) |
| *F16B 5/02* | (2006.01) |
| *F16B 43/02* | (2006.01) |
| *F16G 11/12* | (2006.01) |
| *F24S 25/50* | (2018.01) |

(52) U.S. Cl.
CPC .............. *H02S 20/10* (2014.12); *F16B 5/025* (2013.01); *F16B 43/02* (2013.01); *F16G 11/12* (2013.01); *F24S 25/50* (2018.05)

(58) Field of Classification Search
None
See application file for complete search history.

(56) References Cited

U.S. PATENT DOCUMENTS

| | | |
|---|---|---|
| 3,438,300 A | 4/1969 | Blom et al. |
| 4,832,001 A | 5/1989 | Baer |
| 8,448,390 B1 | 5/2013 | Clemens |

(Continued)

FOREIGN PATENT DOCUMENTS

| | | |
|---|---|---|
| DE | 3613692 A1 | 11/1987 |
| DE | 10116782 A1 | 10/2002 |

(Continued)

*Primary Examiner* — Steven M Marsh
(74) *Attorney, Agent, or Firm* — Cooper Legal Group LLC

(57) ABSTRACT

A mounting system for mounting a photovoltaic panel to a surface includes a mounting base that is supported on the surface. The mounting base defines an elongated opening that extends along an axis. A module mount can be coupled to the mounting base. The module mount includes a first mount portion that is received within the elongated opening of the mounting base such that the module mount is movable with respect to the mounting base along the axis. A second mount portion is coupled to the photovoltaic panel for mounting the photovoltaic panel to the surface through the mounting base.

20 Claims, 18 Drawing Sheets

(56) References Cited

U.S. PATENT DOCUMENTS

| | | | |
|---|---|---|---|
| 8,627,617 B2 | 1/2014 | Haddock | |
| 8,650,812 B2 * | 2/2014 | Cusson | H02S 20/10 |
| | | | 126/621 |
| 8,936,164 B2 * | 1/2015 | Durney | H02S 20/30 |
| | | | 136/251 |
| 10,036,487 B2 * | 7/2018 | Duggan | E04B 1/98 |
| 10,670,303 B2 * | 6/2020 | West | F24S 30/425 |
| 11,563,402 B2 * | 1/2023 | Corio | F16M 11/18 |
| 2005/0284467 A1 * | 12/2005 | Patterson | H02S 20/32 |
| | | | 126/573 |
| 2010/0000516 A1 | 1/2010 | Conger | |
| 2011/0155218 A1 | 6/2011 | Buechel et al. | |
| 2013/0269753 A1 * | 10/2013 | Corio | H02S 20/32 |
| | | | 136/246 |
| 2020/0052643 A1 * | 2/2020 | Ballentine | F16M 11/10 |

FOREIGN PATENT DOCUMENTS

| | | |
|---|---|---|
| DE | 10219106 A1 | 11/2003 |
| DE | 102008057388 A1 | 5/2010 |
| KR | 101004108 B1 | 12/2010 |
| WO | 2012045129 A2 | 4/2012 |
| WO | 2014129800 A1 | 8/2014 |
| WO | 2014175803 A1 | 10/2014 |
| WO | 2017173955 A1 | 10/2017 |
| WO | 2019203710 A1 | 10/2019 |

* cited by examiner

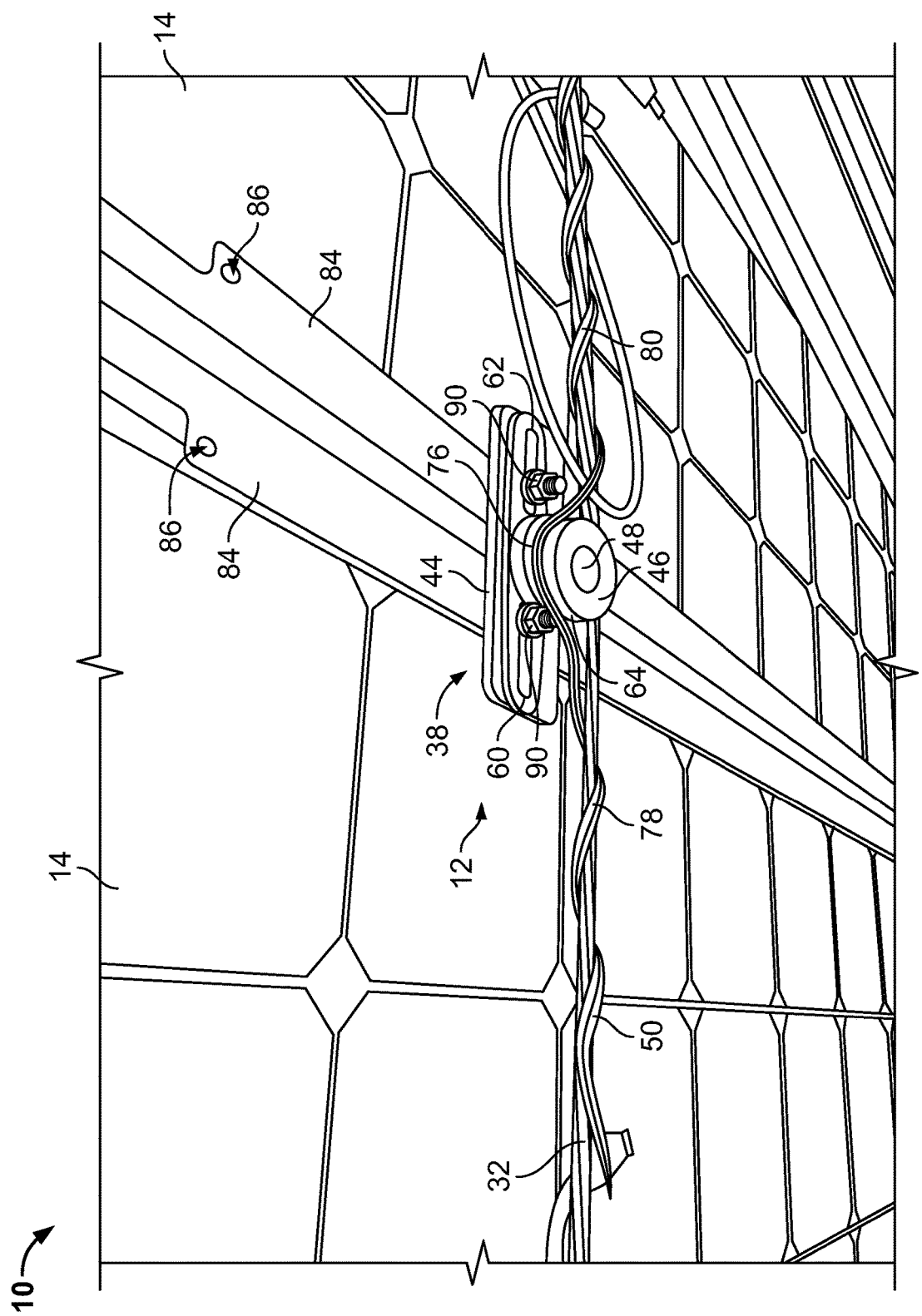

MOUNTING SYSTEM FOR MOUNTING A PHOTOVOLTAIC PANEL

RELATED APPLICATIONS

Benefit is claimed from U.S. Patent Application No. 63/127,498, filed Dec. 18, 2020, U.S. Patent Application No. 63/127,509, filed Dec. 18, 2020 and U.S. Patent Application No. 63/127,525, filed Dec. 18, 2020, the entire contents and disclosures of these applications are incorporated, in entirety, herein by reference.

FIELD

The present disclosure is a patent application and relates generally to support of one or more photovoltaic panels (e.g., solar panels), and associated structures and methods, and within a specific example relates to a system utilizing a mounting structure for attachment to a cable.

BACKGROUND

Photovoltaic, solar panels serve to provide a sustainable source of electrical energy. Often, a plurality of photovoltaic panels are used or organized within an array to output a greater amount of energy.

Photovoltaic panels are mounted upon a rigid mounting structure to provide a desired mounted orientation, space the panels away from a ground (e.g., earth or other man-made structure such as a building), etc.

BRIEF SUMMARY

The following presents a simplified example summary in order to provide a basic understanding of some aspects of the present disclosure. This summary is not an extensive overview of the present disclosure. It is intended to neither identify key or critical elements nor delineate the scope of the present disclosure. Its sole purpose is to present some concepts of the present disclosure in a simplified form as a prelude to the more detailed description that is presented later.

In accordance with at least some aspects, the present disclosure provides a photovoltaic panel mounting system. The system includes a mounting structure. The mounting structure includes an attachment portion configured to be adjustably attached to a first photovoltaic panel. The adjustable attachment of the attachment portion to the first photovoltaic panel is configured to provide for an adjustable distance between the first photovoltaic panel and a second photovoltaic panel. The mounting structure includes a cable attachment portion configured to be attached to a cable to couple the first photovoltaic panel to the cable.

In accordance with at least some aspects, the present disclosure provides a photovoltaic panel mounting system. The system includes a first mounting structure having a first surface and a second surface. The first surface is configured to be attached to a first photovoltaic panel. The second surface is configured to be attached to a cable. The system includes a second mounting structure having a first mounting portion and a second mounting portion. The first mounting portion is configured to be attached to the cable. The second mounting portion is configured to be received within an elongated opening of a rail of a stanchion. The rail extends between a first end and a second end. The second mounting structure is movable within the elongated opening such that a distance between the second mounting structure and the first end of the rail is adjustable.

In accordance with at least some aspects, the present disclosure provides photovoltaic panel mounting system. The system includes a first mounting structure defining a first opening for receiving a fastener. The fastener configured to be received within the first opening and within a first panel opening defined by a first photovoltaic panel to attach the mounting structure to the first photovoltaic panel. The first mounting structure defining a recess for receiving a cable. The system includes a second mounting structure configured to be attached to a stanchion. The second mounting structure defining a second recess for receiving the cable. When the cable is received within the recess of the mounting structure and the second recess of the second mounting structure, the first photovoltaic panel is attached to the stanchion.

The structures, systems, arrangements, etc. provided herein mitigate relatively high material costs and/or high time/labor construction needs that are otherwise associated with mounting structures, systems, etc. made of rigid metal (e.g., aluminum or steel) constructed pieces.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 2 is a photograph of a portion of an example photovoltaic panel array arrangement, such as the example photovoltaic panel array arrangement of FIG. 1A or 1C, and an example mounting structure for mounting an example photovoltaic panel;

DETAILED DESCRIPTION

Figure 1A:
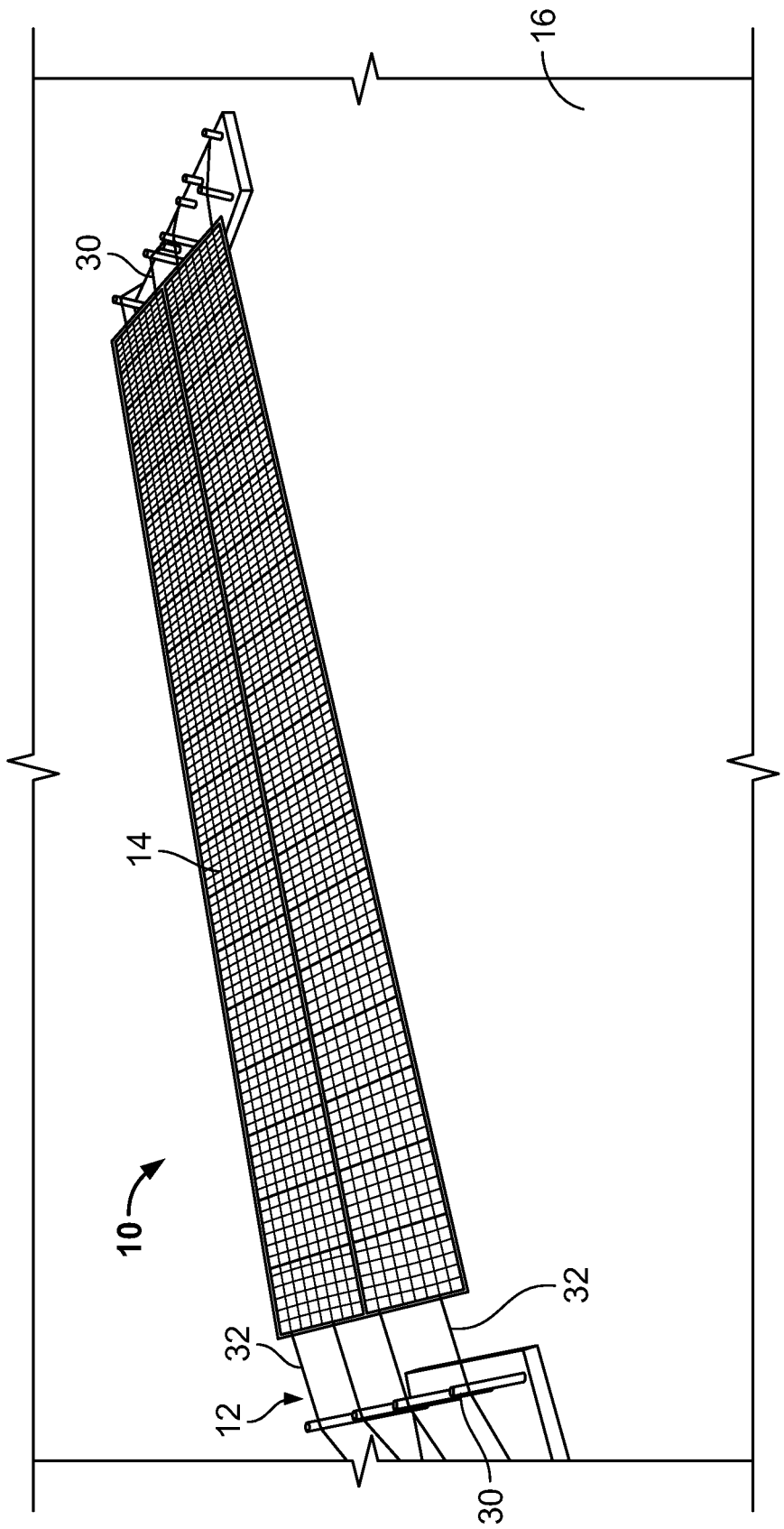
FIG. 1A is a perspective view photograph of an example photovoltaic panel (e.g., solar panel) array arrangement that includes an example photovoltaic panel mounting system, in accordance with an aspect of the present disclosure, with several example photovoltaic panels mounted on the example photovoltaic panel mounting system.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

In accordance with at least some aspects, the present disclosure provides a photovoltaic panel mounting system. The system includes a mounting structure. The mounting structure includes an attachment portion configured to be adjustably attached to a first photovoltaic panel. The adjustable attachment of the attachment portion to the first photovoltaic panel is configured to provide for an adjustable distance between the first photovoltaic panel and a second photovoltaic panel. The mounting structure includes a cable attachment portion configured to be attached to a cable to couple the first photovoltaic panel to the cable.

In accordance with at least some aspects, the present disclosure provides a photovoltaic panel mounting system. The system includes a first mounting structure having a first surface and a second surface. The first surface is configured to be attached to a first photovoltaic panel. The second surface is configured to be attached to a cable. The system includes a second mounting structure having a first mounting portion and a second mounting portion. The first mounting portion is configured to be attached to the cable. The second mounting portion is configured to be received within an elongated opening of a rail of a stanchion. The rail extends between a first end and a second end. The second mounting structure is movable within the elongated opening such that a distance between the second mounting structure and the first end of the rail is adjustable.

In accordance with at least some aspects, the present disclosure provides photovoltaic panel mounting system. The system includes a first mounting structure defining a first opening for receiving a fastener. The fastener configured to be received within the first opening and within a first panel opening defined by a first photovoltaic panel to attach the mounting structure to the first photovoltaic panel. The first mounting structure defining a recess for receiving a cable. The system includes a second mounting structure configured to be attached to a stanchion. The second mounting structure defining a second recess for receiving the cable. When the cable is received within the recess of the mounting structure and the second recess of the second mounting structure, the first photovoltaic panel is attached to the stanchion.

Figure 1B:
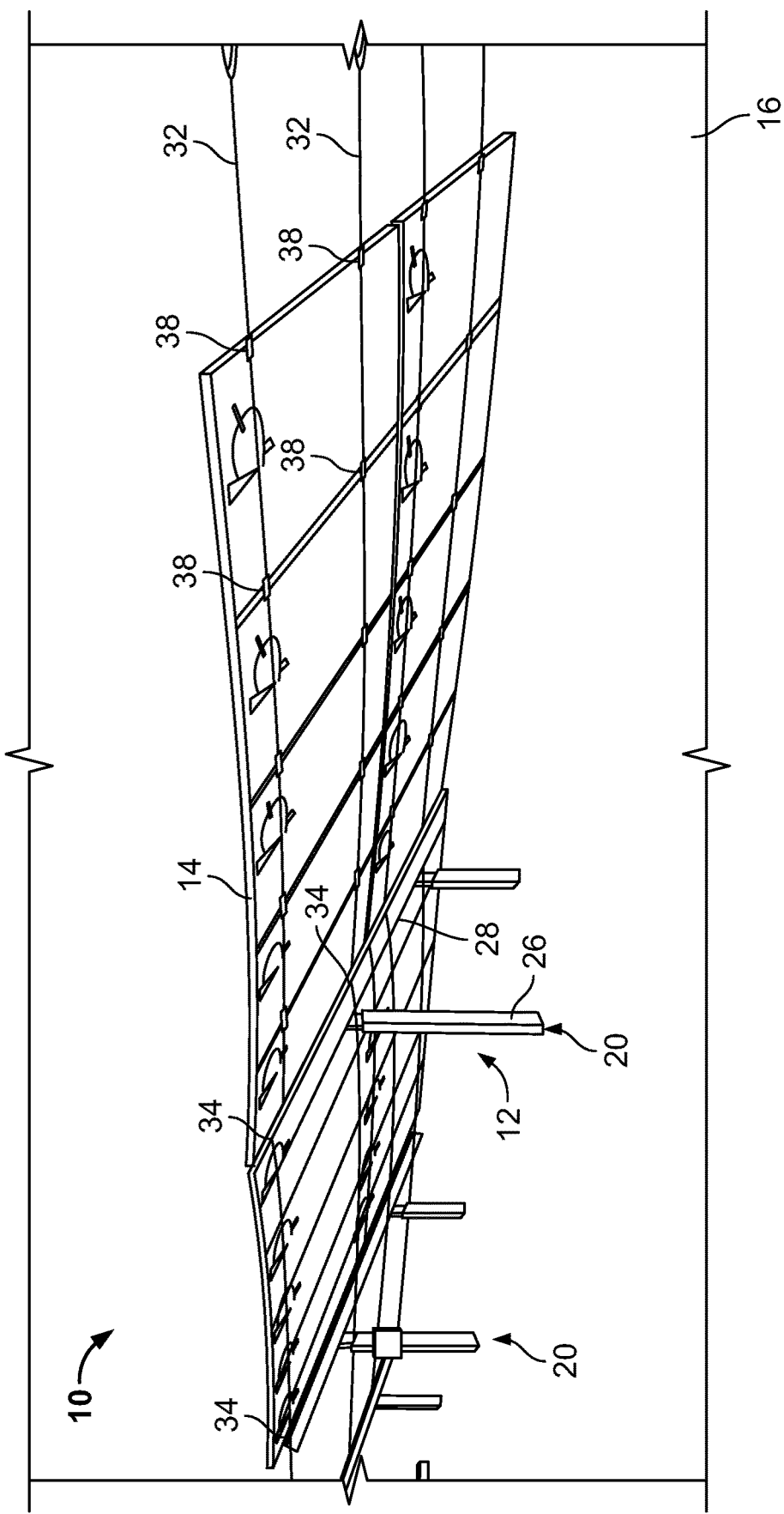
FIG. 1B is a reverse angle perspective view photograph of the example photovoltaic panel array arrangement and the example mounting system of FIG. 1A, with some photovoltaic panels removed and showing several example mounting structures.

An example photovoltaic panel (e.g., solar panel) array arrangement 10 that includes an example photovoltaic panel mounting system 12, in accordance with an aspect of the present disclosure, and a plurality of photovoltaic panels 14 are shown within FIGS. 1A and 1B.

With regard to the photovoltaic panels 14, such panels may also be referred to as PV panels or solar panels. The photovoltaic panels convert light, and in particular sunlight, into electrical energy. Each example photovoltaic panel has a polygonal shape, such as a square or rectangle. Typically, several/many photovoltaic panels are desired to be within the array so as to provide a desired amount of electrical energy. The number of photovoltaic panels need not be a limitation upon the present disclosure.

Within the shown example, the plurality of photovoltaic panels 14 are supported above a surface 16 (e.g., ground). Within the shown example, at least one of the plurality of photovoltaic panels 14 is supported by the photovoltaic panel mounting system 12, in accordance with an aspect of the present disclosure.

It is to be appreciated that the shown example photovoltaic panel mounting system 12 is just an example. Moreover, it is to be appreciated that the scope of the photovoltaic panel mounting system 12 can be varied such at only some portion of the shown example is considered to be the photovoltaic panel mounting system 12. Accordingly, it is to be understood that all portions of the shown example photovoltaic panel mounting system 12 need not be included to provide the photovoltaic panel mounting system 12.

It is to be appreciated that the terms "surface" and "ground" are to be broadly interpreted to mean earth, possibly with vegetation thereon, and/or man-made structure(s), such as building(s), structure(s) or the like. Various types of combinations of natural and man-made portions are within the scope of the terms "surface" and "ground." As such, the particular type of "surface" and "ground" is not a limitation upon the present disclosure.

Attention is directed to FIG. 1B, in which a portion of the photovoltaic panels 14 is removed and in which the shown example photovoltaic panel mounting system 12 is visible. As a general overview, the shown example photovoltaic panel mounting system 12 includes a plurality of stanchions 20. Each of the stanchions 20 is spaced apart from the other of the stanchions 20 in a linear stanchion array and with the spacing between each pair of the stanchions 20 permitting multiple photovoltaic panels 14 to be located between the respective pair of the stanchions 20.

Turning to the stanchions 20, within the shown example of FIGS. 1A and 1B, three (3) stanchions 20 are present. Of course, the number of stanchions may be varied. As such, the number of stanchions need not be a specific limitation upon the present disclosure. Within some examples, the number of stanchions may be related to the number of photovoltaic panels and/or shape/size of photovoltaic panels.

Within one example, the stanchions 20 in general are made of rigid metal, such as steel and/or aluminum. Within an example, some portions of the stanchions have a general "I" beam type construction. Of course, other structural/rigid materials and/or constructions may be used, and such variances are within the scope of the present disclosure. The stanchions 20 may be attached to the surface in any number of ways. For example, the stanchions 20 may be attached to the surface by fasteners, adhesives, welding, and/or by being embedded within the surface (e.g., as illustrated). In this way, the stanchions 20 may be relatively limited from inadvertent movement with respect to the surface.

Within the shown example, each stanchion 20 includes at least one vertical member 26 (two present in the shown example) extending away from the ground 16. Each stanchion 20 includes a transverse member 28 supported by the vertical member 26 above the ground 16 and extending transverse to the extent of the vertical member 26. However, as mentioned, all portions of the shown example photovoltaic panel mounting system 12 need not be included to provide the photovoltaic panel mounting system 12. Accordingly, stanchions 20 need not be present/included in the photovoltaic panel mounting system 12.

Turning briefly to FIG. 1A, the example photovoltaic panel mounting system 12 includes a plurality (e.g., a pair) of anchor arrangements 30 fixed relative to the ground 16. However, as mentioned, all portions of the shown example photovoltaic panel mounting system 12 need not be included to provide the photovoltaic panel mounting system 12. Accordingly, anchor arrangements 30 need not be present/included in the photovoltaic panel mounting system 12.

The system 12 includes a plurality of cables 32. With the shown example of FIGS. 1A and 1B, four cables are provided. However, a different number of cables is contemplated and within the scope of this disclosure. Within the shown example, each cable 32 is under tension and extends between the two anchor arrangements 30.

The example photovoltaic panel mounting system 12 includes a plurality of a type of photovoltaic panel mounting structures 34 (FIG. 1B). Specifically, each of the cables 32 extends to a location in proximity to a respective point (see FIG. 1B for example) on the transverse member 28 of each of the plurality of stanchions 20. The mentioned type of photovoltaic panel mounting structures 34 are for attachment between a cable 32 and a stanchion 20 (e.g., attachment of cable to stanchion). As such, each respective cable 32 is supported by the transverse member 28 of each of the plurality of stanchions 20.

The example photovoltaic panel mounting system 12 includes another type of plurality of photovoltaic panel mounting structures 38 (FIG. 1B). Each photovoltaic panel mounting structure 38 is secured to a point on a respective one of the photovoltaic panels 14 and secured to a respective one of the cables 32. As such, each photovoltaic panel 14 is coupled to the respective cable 32. Within the shown example, a multiple of the photovoltaic panel mounting structures 38 are secured to each photovoltaic panel 14 and the multiple of the photovoltaic panel mounting structures 38 are distributed to be secured to multiple of the cables 32. Within the shown example, each respective photovoltaic panel 14 is retained within an array of the photovoltaic panels extending along the cables 32. See FIG. 1A for an example array of photovoltaic panels, and note that FIG. 1A shows the full example array as compared to FIG. 1B that has some of the array removed.

As mentioned, all portions of the shown example photovoltaic panel mounting system 12 need not be included to provide the photovoltaic panel mounting system 12. Accordingly, just one type of the photovoltaic panel mounting structures 34 or 38 may provide the photovoltaic panel mounting system 12. Further, a single photovoltaic panel mounting structure 34 or 38 may provide the photovoltaic panel mounting system 12. Specifically, a single one of either type (i.e., photovoltaic panel mounting structure 34 or photovoltaic panel mounting structure 38) may provide the photovoltaic panel mounting system 12.

Figure 1C:
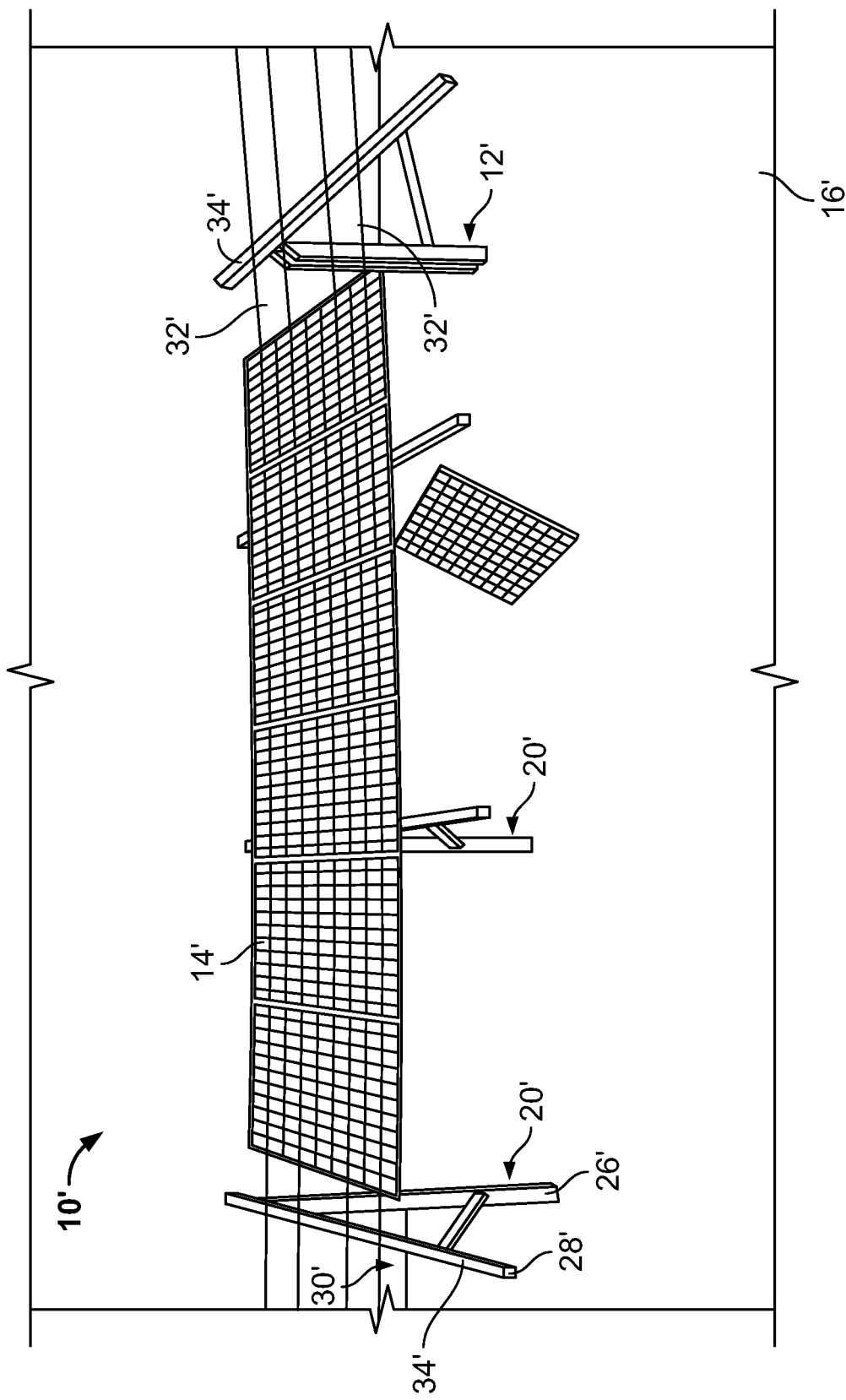
FIG. 1C is a perspective view photograph of another example photovoltaic panel array arrangement that includes an example photovoltaic panel mounting system, in accordance with an aspect of the present disclosure, with several example photovoltaic panels mounted on the example photovoltaic panel mounting system.

Another example photovoltaic panel (e.g., solar panel) array arrangement 10' that includes an example photovoltaic panel mounting system 12', in accordance with an aspect of the present disclosure, and a plurality of photovoltaic panels 14' is shown within FIG. 1C. Within this other example, similar reference numerals are utilized as within the previous example photovoltaic panel array arrangement 10 (FIGS. 1A and 1B), but with a "'" (prime) added. Such signifies that the items are same/similar, but that some difference(s) is possible.

Within the shown example of FIG. 1C, the plurality of photovoltaic panels 14' are supported above a surface 16' (e.g., ground). Within this shown example (FIG. 1C), at least one of the plurality of photovoltaic panels 14' is supported by the photovoltaic panel mounting system 12', in accordance with an aspect of the present disclosure.

It is to be appreciated that the shown example photovoltaic panel mounting system 12' is just an example. Moreover, it is to be appreciated that the scope of the photovoltaic panel mounting system 12' can be varied such at only some portion of the shown example is considered to be the photovoltaic panel mounting system 12'. Accordingly, it is to be understood that all portions of the shown example photovoltaic panel mounting system 12' need not be included to provide the photovoltaic panel mounting system 12'.

The shown example photovoltaic panel mounting system 12' includes a plurality of stanchions 20'. Each of the stanchions 20' is spaced apart from the other of the stanchions 20' in a linear stanchion array and with the spacing between each pair of the stanchions 20' permitting one or more photovoltaic panels 14' to be located between the respective pair of the stanchions 20'.

Within the shown example, each stanchion 20' includes at least one vertical member 26' extending away from the ground 16'. Each stanchion 20' includes a transverse member 28' supported by the vertical member 26' above the ground 16' and extending transverse to the extent of the vertical member 26'. However, as mentioned, all portions of the shown example photovoltaic panel mounting system 12' need not be included to provide the photovoltaic panel mounting system 12'. Accordingly, stanchions 20' need not be present/included in the photovoltaic panel mounting system 12'.

The example photovoltaic panel mounting system 12' includes a plurality (e.g., a pair) of anchor arrangements 30' (located at the torn-away portions of FIG. 1C) fixed relative to the ground 16'. The system 12' includes a plurality of cables 32'. With the shown example of FIG. 1C, two cables 32' are provided. However, a different number of cables 32' is contemplated and within the scope of this disclosure. Each cable 32' is under tension and extends between the two anchor arrangements 30'. However, as mentioned, all portions of the shown example photovoltaic panel mounting system 12' need not be included to provide the photovoltaic panel mounting system 12'. Accordingly, anchor arrangements 30' need not be present/included in the photovoltaic panel mounting system 12'.

The example photovoltaic panel mounting system 12 includes a plurality of a type of photovoltaic panel mounting structures 34'. Specifically, each of the cables 32 extends to a location in proximity to a respective point on the transverse member 28' of each of the plurality of stanchions 20'. The mentioned type of photovoltaic panel mounting structures 34' are for attachment between a cable 32' and a stanchion 20' (e.g., attachment of cable to stanchion). As such, each respective cable 32' is supported by the transverse member 28' of each of the plurality of stanchions 20'.

The example photovoltaic panel mounting system 12' includes a plurality of photovoltaic panel mounting structures 38' (not readily visible in FIG. 1C, see FIG. 1B for reference). Each photovoltaic panel mounting structure 38' is secured to a point on a respective one of the photovoltaic panels 14' and secured to a respective one of the cables 32'. Within the shown example, a multiple of the photovoltaic panel mounting structures 38' are secured to each photovoltaic panel 14' and the multiple of the photovoltaic panel mounting structures 38' are distributed to be secured to multiple of the cables 32' (not readily visible in FIG. 1C, see FIG. 1B for reference). Within the shown example, each respective photovoltaic panel 14' is retained within an array of the photovoltaic panels extending along the cables 32'.

As mentioned, all portions of the shown example photovoltaic panel mounting system 12' need not be included to provide the photovoltaic panel mounting system 12'. Accordingly, the photovoltaic panel mounting structures 34' or 38' may provide the photovoltaic panel mounting system 12'. Further, a single photovoltaic panel mounting structure 34' or 38' may provide the photovoltaic panel mounting system 12'.

It is to be appreciated that the example of FIG. 1C shows one possible variation that is difference from the example of FIGS. 1A and 1B. Variations of the photovoltaic panel array arrangement 10/10' and/or the photovoltaic panel mounting system 12/12' are within the scope of this disclosure.

Herein, the above discussed structures for the examples with and without the "'" (prime) may simply be referred to by its numeral without use of the prime for simplicity. The examples are provided to shown that variation is contemplated and within the scope of the present disclosure. It is to be appreciated that, the above-mentioned structures, components, interactions, etc. may be varied. Such variation(s) is within the scope of the present disclosure, and thus need not be specific limitation(s) upon the present disclosure. With such appreciation and understanding, some further example specifics are presented following.

The photovoltaic panel mounting structure(s) 34 or 38 are generically presented within FIGS. 1A-1C. Such generic presentation is to shown that variation is contemplated and within the scope of the present disclosure. It is to be appreciated that, the above-mentioned photovoltaic panel mounting structure(s) 34 or 38 may be varied. Such variation(s) is within the scope of the present disclosure, and thus need not be specific limitation(s) upon the present disclosure. With such appreciation and understanding, some further example specifics are presented following. Accordingly, some examples of the photovoltaic panel mounting structure(s) 34 and 38 are discussed further following. Of course, variations are possible, contemplated and within the scope of the present disclosure.

Figure 3:
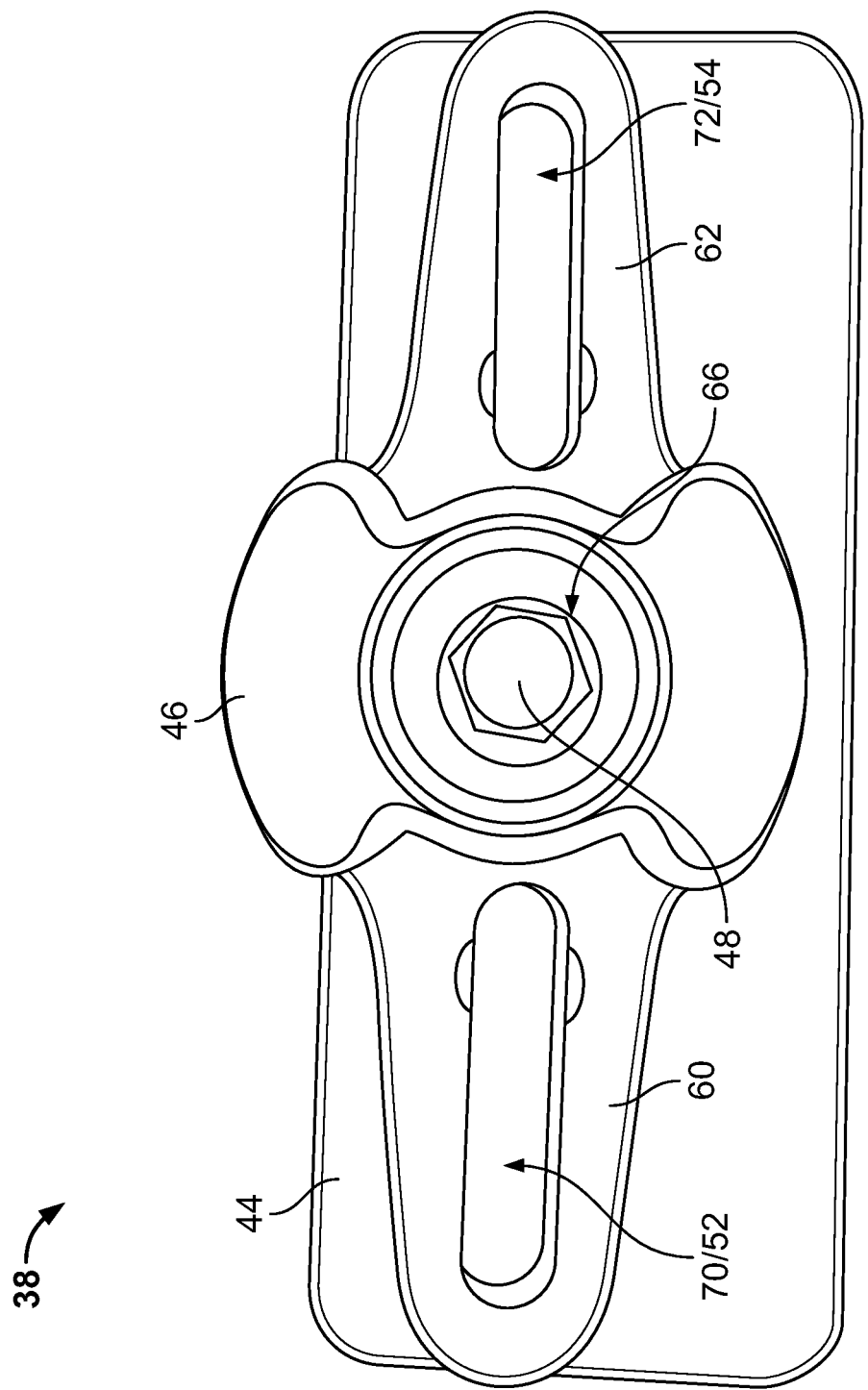
FIG. 3 is a photograph of the example mounting structure of FIG. 2.
Figure 4:
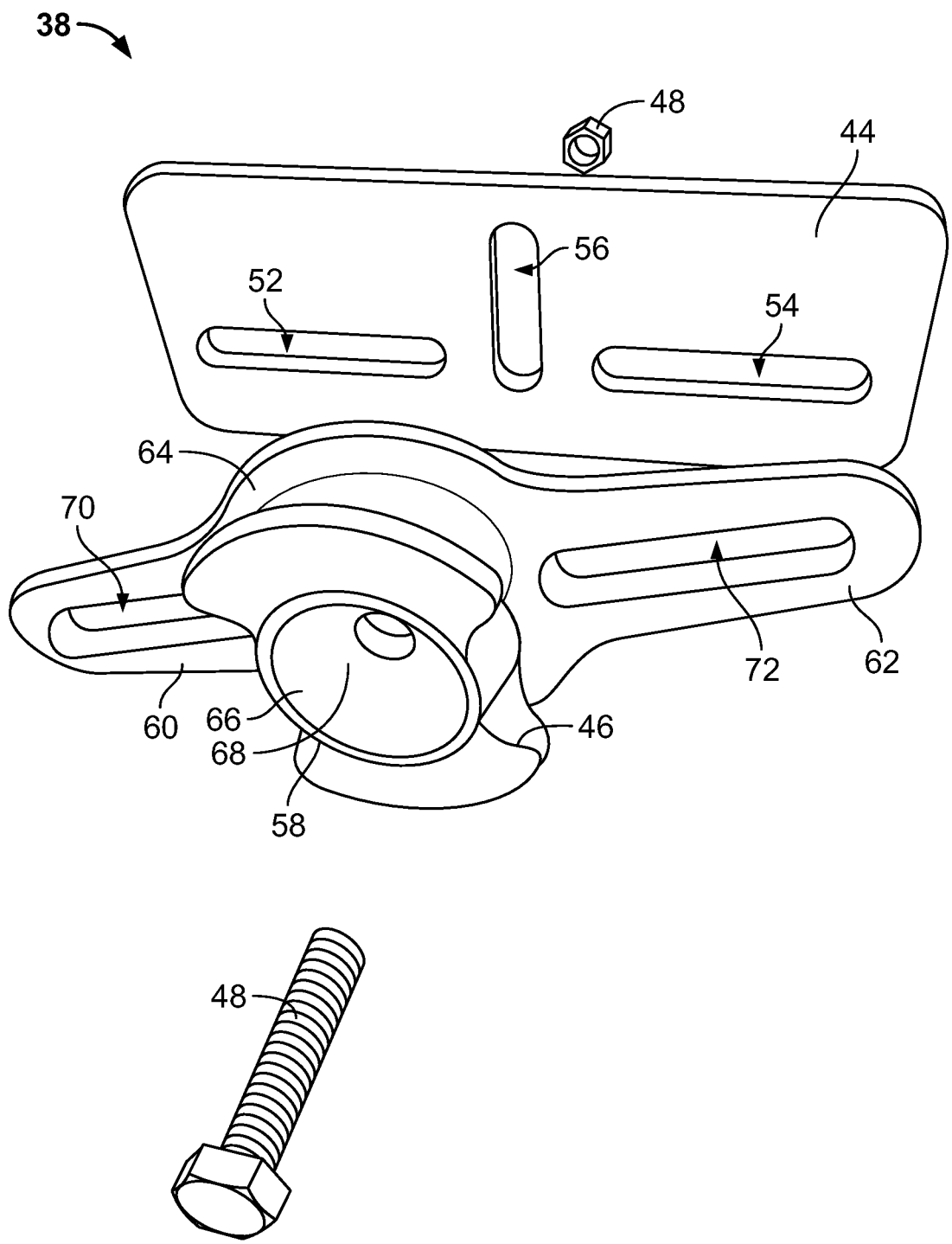
FIG. 4 is a photograph of the example mounting structure of FIG. 3 shown in a disassembled state.

FIG. 2 shows an example photovoltaic panel mounting structure 38 of the mounting system 12. The photovoltaic panel mounting structure 38 is adjustably attached to one of the cables 32 and adjustably attached to at least one of the photovoltaic panels 14. As such, the photovoltaic panel mounting structure 38 is attached to the cable 32 at a first cable location of the cable, with the first cable location being selected as part of the process to provide the photovoltaic panel array. FIGS. 3 and 4 show some example portions of the example photovoltaic panel mounting structure 38, which include a flat plate 44, a bobbin-like member 46 and a fastener arrangement 48. FIG. 2 shows another portion of the example photovoltaic panel mounting structure 38 as a cable wrap 50.

The flat plate 44 (FIG. 4) has three elongate slots 52, 54, 56 extending through the flat plate, from a first flat face of the plate to a second flat face of the plate. Slots 52 and 54 have elongations that are generally parallel to each other. Moreover, slots 52 and 54 are generally elongated along a same line (e.g., co-linear). Slot 56 has an elongation that is generally transverse (e.g., perpendicular) to the elongations of the slots 52 and 54. Moreover, slot 56 is located generally at a middle portion of the plate 44, with the slots 52 and 54 each being located at a respective opposite side of the plate.

The bobbin-like member 46 has a central hub 58 and two wing-like extensions 60, 62. The central hub 58 has an exterior spool recess 64 and a central through-bore 66 that has an interior shoulder 68. Each wing-like extension 60, 62 has a respective elongate slot 70, 72.

The bobbin-like member 46 and the plate 44 are pressed and held together by the fastener arrangement 48 (e.g., a bolt and nut, see FIGS. 2 and 3). The elongate slots 70, 72 of the bobbin-like member 46 generally align/overlay the elongate slots 52, 54, respectively, of the plate 44. The central through-bore 66 of the bobbin-like member 46 generally overlays a portion of the centrally located elongate slot 56 of the plate 44, with the fastener arrangement 48 (e.g., a bolt and nut) extending through the central through-bore 66 and the centrally located elongate slot 56.

Focusing upon FIG. 2, note that the bobbin-like member 46 of the example photovoltaic panel mounting structure 38 is located relative to the cable 32 such that the cable 32 is located in a first (e.g., lower as viewed in FIG. 2) part of the exterior spool recess 64 of the central hub 58. When the cable 32 is received within the recess 64, a first surface of the cable is bordered by the central hub 58 (e.g., cable attachment portion) and a second (lowest as viewed in FIG. 2) surface of the cable is not bordered by the central hub (i.e., unbordered).

Also note that the cable wrap 50 has a portion 76 that is located in a second (e.g., upper as viewed in FIG. 2) part of the exterior spool recess 64 of the central hub 58. As such, the central hub 58 of the bobbin-like member 46 is entrapped between the cable 32 and the cable wrap 50. Still further noted that the cable wrap 50 has portions 78, 80 that extend out to either side of the bobbin-like member 46 and wrap around the cable 32. As such, the bobbin-like member 46, and thus the entire example photovoltaic panel mounting structure 38, is held in position relative to the cable 32.

Within one example, the plate 44 may be made of metal, the bobbin-like member 46 may be made of a polymer-based material, the cable wrap 50 may be made of metal, and the fastener arrangement 48 may be made metal. Of course, different materials or different combinations of materials may be used.

Within FIG. 2, note that portions of two photovoltaic panels 14 are shown. For each photovoltaic panel 14, a respective portion of a frame 84 of each respective photovoltaic panel 14 is shown. It is to be noted that bolt holes 86 (some not visible) extend into/through each frame 84 of the respective photovoltaic panel 14. It is to be appreciated that each photovoltaic panel 14 is positioned relative to the photovoltaic panel mounting structure 38, and the cable 32, such that a respective one of the bolt holes 86 is aligned/overlaid with a portion of a respective set of elongate slots 70/52 or 72/54 of the photovoltaic panel mounting structure 38. A fastener arrangement 90 (e.g., bolt and nut) extends through each respective one of the bolt holes 86 and a respective set of elongate slots 70/52 or 72/54. Note that each fastener arrangement 90 may be selectively placed (i.e., adjusted) along the elongation of the respective set of elongate slots 70/52 or 72/54. Such provides adjustability. When the fastener arrangement 90 is tightened, each respective photovoltaic panel 14 is held in position relative to the photovoltaic panel mounting structure 38 and thus held in position relative to the cable 32. It is worth noting that the elongation of the slot 56 will also allow some adjustability of the plate 44 and the bobbin-like member 46.

It is to be appreciated that the selection of where to place the photovoltaic panel mounting structure 38 along the cable 32 prior to fixing via the cable wrap 50 provides for adjustability of the photovoltaic panel mounting structure 38 along the cable 32. It is to be appreciated that the selection of the particular bolt hole 86 of the photovoltaic panel 14 for location adjacent to the photovoltaic panel mounting structure 38, for alignment/overlaying with a portion of a respective set of elongate slots 70/52 or 72/54, provides for adjustability of photovoltaic panel 14 relative to the photovoltaic panel mounting structure 38 and thus the cable 32. It is to be appreciated that the selection of location of the particular bolt hole 86 of the photovoltaic panel 14 along the elongation of the respective set of elongate slots 70/52 or 72/54 provides for adjustability of photovoltaic panel 14 relative to the photovoltaic panel mounting structure 38 and thus the cable 32.

Recall that the example photovoltaic panel mounting structure 38 is configured such that two photovoltaic panels 14 are attached/supported. As such, the above-discussed adjustability is accorded to each/both of the two photovoltaic panels 14. Moreover, it is to be appreciated that some of the adjustability aspects provide for common adjustability of both of the two photovoltaic panels 14 together relative to the cable 32. An example of such is the adjustability of the photovoltaic panel mounting structure 38, and thus the two photovoltaic panels 14, along the cable 32. It is to be appreciated that some of the adjustability aspects provide adjustability of a first of the two photovoltaic panels 14 to a second of the two photovoltaic panels 14. An example of such is the adjustability provided by the elongate slots (e.g., slot sets 70/52 or 72/54) to permit adjustment of just one or both two photovoltaic panels 14 relative to the photovoltaic panel mounting structure 38 and thus possibly relative to the cable 32.

In accordance with an aspect of the present disclosure, the photovoltaic panel mounting structure 38 provides an attachment portion (e.g., the plate 44 and/or one of the wing-like extensions 60, 62 of the bobbin-like member 46) configured to be adjustably attached to a first photovoltaic panel 14. The adjustable attachment of the attachment portion to the first photovoltaic panel 14 is configured to provide for an adjustable distance between one (e.g., a first) photovoltaic panel 14 and another (e.g., a second) photovoltaic panel 14.

In accordance with an aspect of the present disclosure, the photovoltaic panel mounting structure 38 provides a cable attachment portion configured to be attached to the cable 32 to couple the first photovoltaic panel 14 to the cable 32. An example of such is the central hub 58 of the bobbin-like member 46 and/or the cable wrap 50.

Figure 5:
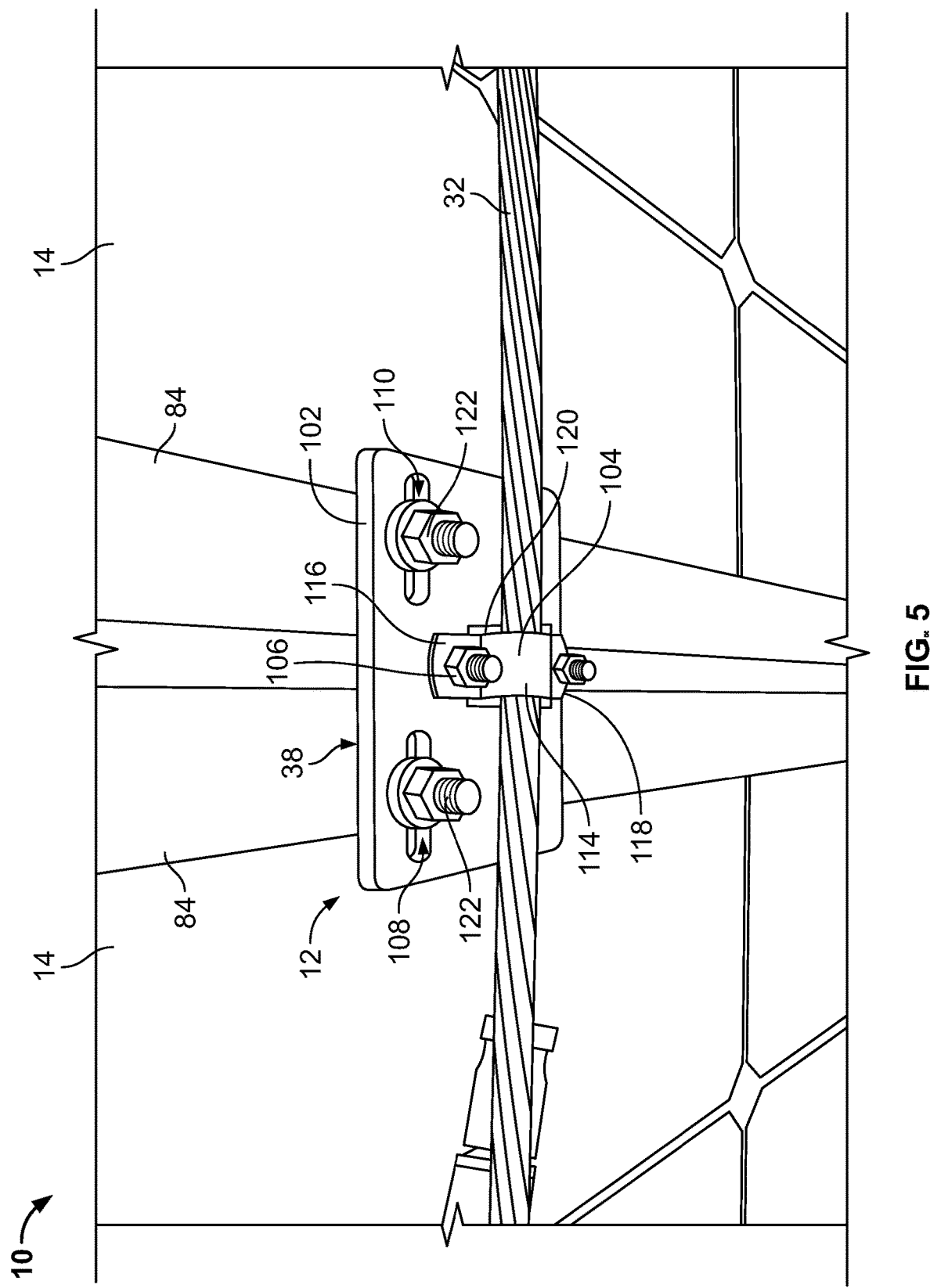
FIG. 5 is a photograph of an example portion of an example photovoltaic panel array arrangement, such as the example photovoltaic panel array arrangement of FIG. 1A or 1C, and another example mounting structure for mounting an example photovoltaic panel.

Another example photovoltaic panel (e.g., solar panel) array arrangement 10 that includes another example photovoltaic panel mounting system 12, in accordance with an aspect of the present disclosure, and a plurality of photovoltaic panels 14 is shown within FIG. 5. It is to be noted that some of the same reference numerals are utilized as were used within the previously discussed general discussions of examples of photovoltaic panel array arrangements 10 and the previously discuss example of photovoltaic panel mounting system 12. It will be appreciated that new, different reference numeral are used follow for different specific structures.

Figure 6:
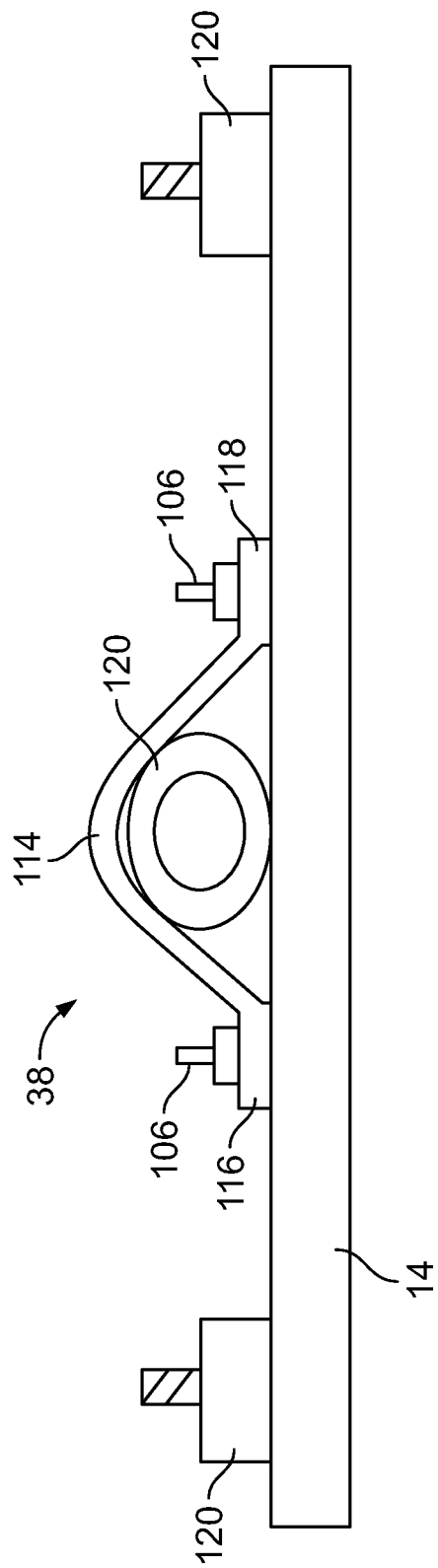
FIG. 6 is a schematic side view illustration of the of the example mounting structure of FIG. 5.

The photovoltaic panel mounting structure 38 is adjustably attached to one of the cables 32 and adjustably attached to at least one of the photovoltaic panels 14. As such, the photovoltaic panel mounting structure 38 is attached to the cable 32 at a first cable location of the cable, with the first cable location being selected as part of the process to provide the photovoltaic panel array. FIGS. 5 and 6 show some example portions of the example photovoltaic panel mounting structure 38, which include a flat plate 102, a clamp member 104 and a fastener arrangement 106.

The flat plate 102 (FIG. 5) has multiple elongate slots 108 and 110 extending through the flat plate, from a first flat face of the plate to a second flat face of the plate. Only two elongate slots 108 and 110 are visible within FIG. 5, however, more than two elongate slots are contemplated/present. Slots 108 and 110 have elongations that are generally parallel to each other. Moreover, slots 108 and 110 are generally elongated along a same line (e.g., co-linear). One or more other slots has/have an elongation that is generally transverse (e.g., perpendicular) to the elongations of the slots 1-8 and 110. Moreover, such other slot(s) are located generally at a middle portion of the plate 102, with the slots 108 and 110 each being located at a respective opposite side of the plate.

The example clamp member 104 has a central arc portion 114 and two wing-like extensions 116, 118. Each wing-like extension 116, 118 has a respective through-bore. The example clamp member 104 also includes an optional resilient liner 120 located within the central arc portion 114. The resilient liner120 may have a generally cylindrical shape, with a split along one side of the cylinder shape.

The clamp member 104 and the plate 102 are pressed and held together by the fastener arrangement 106. Within the shown example, the fastener arrangement 106 includes two bolt and nut combinations. Specifically, the through bores of the clamp member 104 generally align/overlay the central (and non-visible) slot(s) of the plate 102. The fastener arrangement 48 (e.g., the mentioned bolts and associated nuts) extend through the through-bores and the centrally located elongate slot(s).

Note that the clamp member 104 of the example photovoltaic panel mounting structure 38 is located relative to the cable 32 such that the cable 32 is located within central arc portion 114. Further, the cable 32 is located within the resilient liner120. It is to be noted that the split along one side of the cylinder shape may allow easy placement of the resilient liner120 at any location along the length of the cable 32. Tightening of the fastener arrangement 48 (e.g., the mentioned bolts and associated nuts) retains and holds the cable relative to the clamp member 104, the plate 102, and thus the example photovoltaic panel mounting structure 38.

Within FIG. 5, note that portions of two photovoltaic panels14 are shown. Similar to the previously discussed example, for each photovoltaic panel 14, a respective portion of a frame 84 is shown. It is to be noted that bolt holes (not visible in FIG. 5) extend into/through each frame 84 of the respective photovoltaic panel 14. It is to be appreciated that each photovoltaic panel 14 is positioned relative to the photovoltaic panel mounting structure 38, and the cable 32, such that a respective one of the bolt holes is aligned/overlaid with a portion of a respective set of elongate slots 108 or 110 of the photovoltaic panel mounting structure 38. A fastener arrangement 122 (e.g., bolt and nut) extends through each respective one of the bolt holes respective set of elongate slots 108 or 110. Note that each fastener arrangement 122 may be selectively placed (i.e., adjusted) along the elongation of the respective set of elongate slots 108 or 110. Such provides adjustability. When the fastener arrangement 122 is tightened, each respective photovoltaic panel 14 is held in position relative to the photovoltaic panel mounting structure 38 and thus held in position relative to the cable 32. It is worth noting that the elongation of the slot(s) (not visible) will also allow some adjustability between the plate 102 and the clamp member 104. Thus, such provides for some adjustability between the photovoltaic panel(s) 14 and the cable 32.

It is to be appreciated that the selection of where to place the photovoltaic panel mounting structure 38 along the cable 32 prior to tightening the fastener arrangement 106 provides for adjustability of the photovoltaic panel mounting structure 38 along the cable. It is to be appreciated that the selection of the particular bolt hole (not shown in FIG. 5) of the photovoltaic panel 14 for location adjacent to the photovoltaic panel mounting structure 38, for alignment/overlaying with a portion of a respective set of elongate slots 108 or 110, provides for adjustability of photovoltaic panel 14 relative to the photovoltaic panel mounting structure 38 and thus the cable 32. It is to be appreciated that the selection of location of the particular bolt hole (not shown in FIG. 5) of the photovoltaic panel 14 along the elongation of the respective set of elongate slots 108 or 110 provides for adjustability of photovoltaic panel 14 relative to the photovoltaic panel mounting structure 38 and thus the cable 32.

Recall that the example photovoltaic panel mounting structure 38 is configured such that two photovoltaic panels 14 are attached/supported. As such, the above-discussed adjustability is accorded to each/both of the two photovoltaic panels 14. Moreover, it is to be appreciated that some of the adjustability aspects provided for common adjustability of both of the two photovoltaic panels 14 together relative to the cable 32. An example of such is the adjustability of the photovoltaic panel mounting structure 38, and thus the two photovoltaic panels 14, along the cable 32. It is to be appreciated that some of the adjustability aspects provide adjustability of a first of the two photovoltaic panels 14 to a second of the two photovoltaic panels 14. An example of such is the adjustability provided by the elongate slots (e.g., slot sets 108 or 110) to permit adjustment of just one or both two photovoltaic panels 14 relative to the photovoltaic panel mounting structure 38 and thus possibly relative to the cable 32.

In accordance with an aspect of the present disclosure, the photovoltaic panel mounting structure 38 provides an attachment portion (e.g., the plate 102 configured to be adjustably attached to a first photovoltaic panel 14. The adjustable attachment of the attachment portion to the first photovoltaic panel 14 is configured to provide for an adjustable distance between the first photovoltaic panel 14 and a second photovoltaic panel 14.

In accordance with an aspect of the present disclosure, the photovoltaic panel mounting structure 38 provides a cable attachment portion configured to be attached to the cable 32 to couple the first photovoltaic panel 14 to the cable. An example of such is the clamp member 104 and/or the optional resilient liner 120.

Within one example, the plate 102 may be made of metal, the clamp member 104 may be made of metal, the resilient liner 120 may be made of rubber or similar material, and the fastener arrangements may be made metal. Of course, different materials or different combinations of materials may be used.

It is to be appreciated that the above-discussed two examples of the photovoltaic panel mounting structure 38 provide for attachment to two photovoltaic panels 14. It is contemplated that the photovoltaic panel mounting structure 38 may be for attachment to a different number (i.e., different from two) photovoltaic panels 14. For example, the photovoltaic panel mounting structure 38 may be provided for attachment to one photovoltaic panel 14. See the example of FIG. 7.

Figure 7:
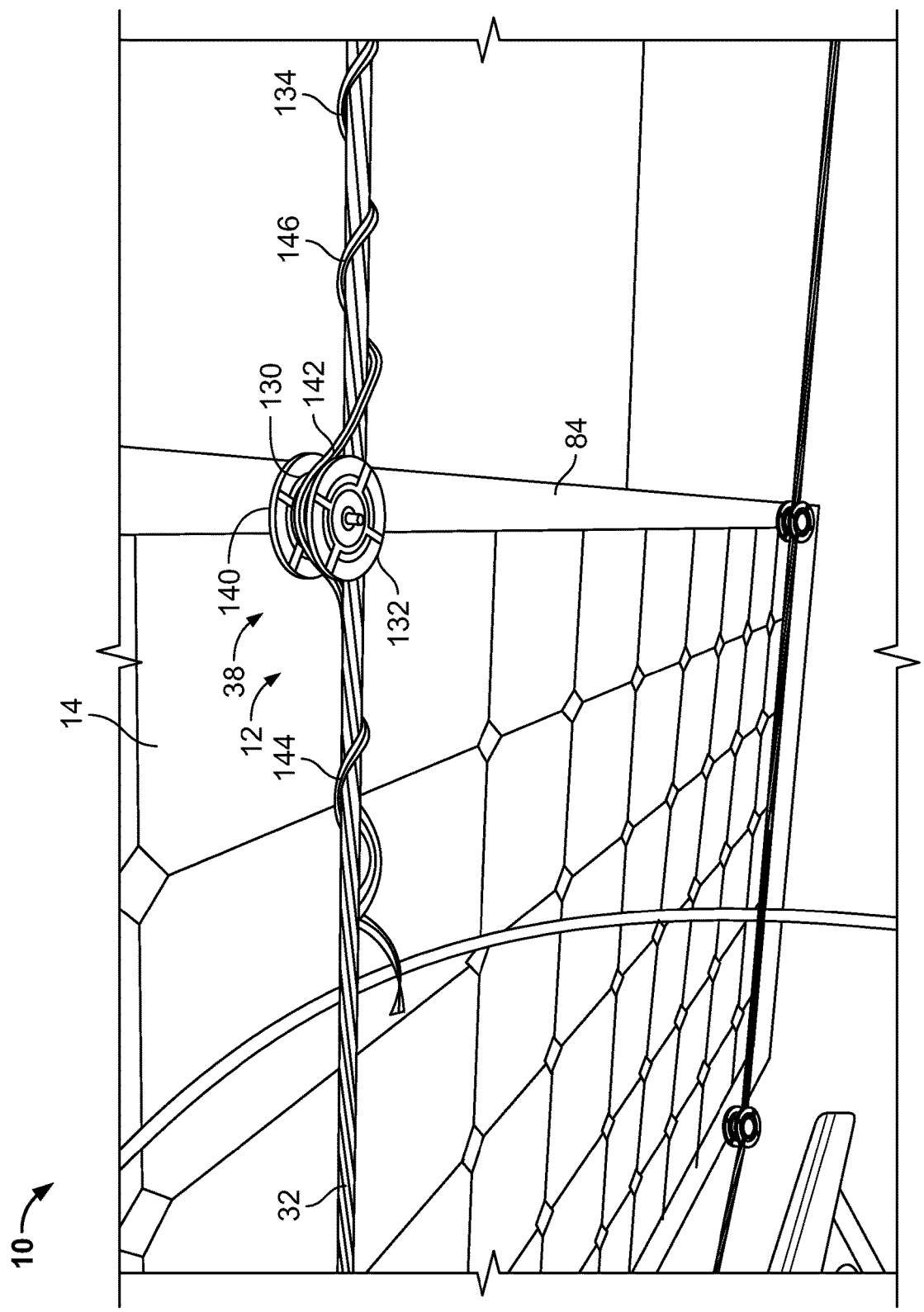
FIG. 7 is a photograph of an example portion of an example photovoltaic panel array arrangement, such as the example photovoltaic panel array arrangement of FIG. 1A or 1C, and another example mounting structure for mounting an example photovoltaic panel.

FIG. 7 shows an example photovoltaic panel mounting structure 38 of the mounting system 12. The photovoltaic panel mounting structure 38 is adjustably attached to one of the cables 32 and adjustably attached to one of the photovoltaic panels 14. As such, the photovoltaic panel mounting structure 38 is attached to the cable 32 at a first cable location of the cable, with the first cable location being selected as part of the process to provide the photovoltaic panel array. The example photovoltaic panel mounting structure 38 includes a bobbin-like member 130, a fastener arrangement 132 and a cable wrap 134.

The bobbin-like member 130 has an exterior spool recess 140 and a central through-bore (not visible in FIG. 7). Note that the bobbin-like member 130 of the example photovoltaic panel mounting structure 38 is located relative to the cable 32 such that the cable 32 is located in a first (e.g., lower as viewed in FIG. 7) part of the exterior spool recess 140. When the cable 32 is received within the recess 140, a first surface of the cable is bordered by the bobbin-like member 130 (e.g., cable attachment portion) and a second (lowest as viewed in FIG. 7) surface of the cable is not bordered by the bobbin-like member (i.e., unbordered).

Also note that the cable wrap 134 has a portion 142 that is located in a second (e.g., upper as viewed in FIG. 7) part of the exterior spool recess 140 of the bobbin-like member 130. As such, the bobbin-like member 130 is entrapped between the cable 32 and the cable wrap 134. Still further noted that the cable wrap 134 has portions 144, 146 that extend out to either side of the bobbin-like member 130 and wrap around the cable 32. As such, the bobbin-like member 130, and thus the entire example photovoltaic panel mounting structure 38, is held in position relative to the cable 32.

Within one example, the bobbin-like member 130 may be made of a polymer-based material, the cable wrap 134 may be made of metal, and the fastener arrangement 132 may be made metal. Of course, different materials or different combinations of materials may be used.

Within FIG. 7, note that a portion of one photovoltaic panel14 is shown. For each photovoltaic panel 14, a respective portion of a frame 84 is shown. It is to be noted that bolt holes (not visible in FIG. 7) extend into/through the frame 84 of the photovoltaic panel 14. It is to be appreciated that the photovoltaic panel 14 is positioned relative to the photovoltaic panel mounting structure 38, and the cable 32, such that a respective one of the bolt holes is aligned/overlaid with the bore of the bobbin-like member 130 of the photovoltaic panel mounting structure 38. The fastener arrangement 132 (e.g., bolt and nut) extends through the bolt hole of the frame 84 and bore of the bobbin-like member 130. When the fastener arrangement 132 is tightened, each respective photovoltaic panel 14 is held in position relative to the photovoltaic panel mounting structure 38 and thus held in position relative to the cable 32.

Within one example, the bobbin-like member 130 may be made of a polymer-based material, the cable wrap 134 may be made of metal, and the fastener arrangement 132 may be made metal. Of course, different materials or different combinations of materials may be used.

It is to be appreciated that the selection of where to place the photovoltaic panel mounting structure 38 along the cable 32 prior to fixing via the cable wrap 134 provides for adjustability of the photovoltaic panel mounting structure 38 along the cable. It is to be appreciated that the selection of the particular bolt hole on the frame of the photovoltaic panel 14 for location adjacent to the photovoltaic panel mounting structure 38 provides for adjustability of photovoltaic panel 14 relative to the photovoltaic panel mounting structure 38 and thus the cable 32.

Recall that the above-discussed example photovoltaic panel mounting structure 38 is configured such that one photovoltaic panel 14 is attached/supported. However, it is to be appreciated that the above-discussed adjustability also can provide for adjustability relative to an adjacent photovoltaic panel 14.

In accordance with an aspect of the present disclosure, the photovoltaic panel mounting structure 38 provides an attachment portion (e.g., part of the bobbin-like member 46 and/or the fastening arrangement 138) configured to be adjustably attached to a first photovoltaic panel 14. The adjustable attachment may provide for an adjustable distance between a first photovoltaic panel 14 and a second photovoltaic panel 14. In accordance with an aspect of the present disclosure, the photovoltaic panel mounting structure 38 provides a cable attachment portion configured to be attached to the cable 32 to couple the photovoltaic panel 14 to the cable. An example of such is the recess 140 of the bobbin-like member 46 and/or the cable wrap 50.

Figure 8:
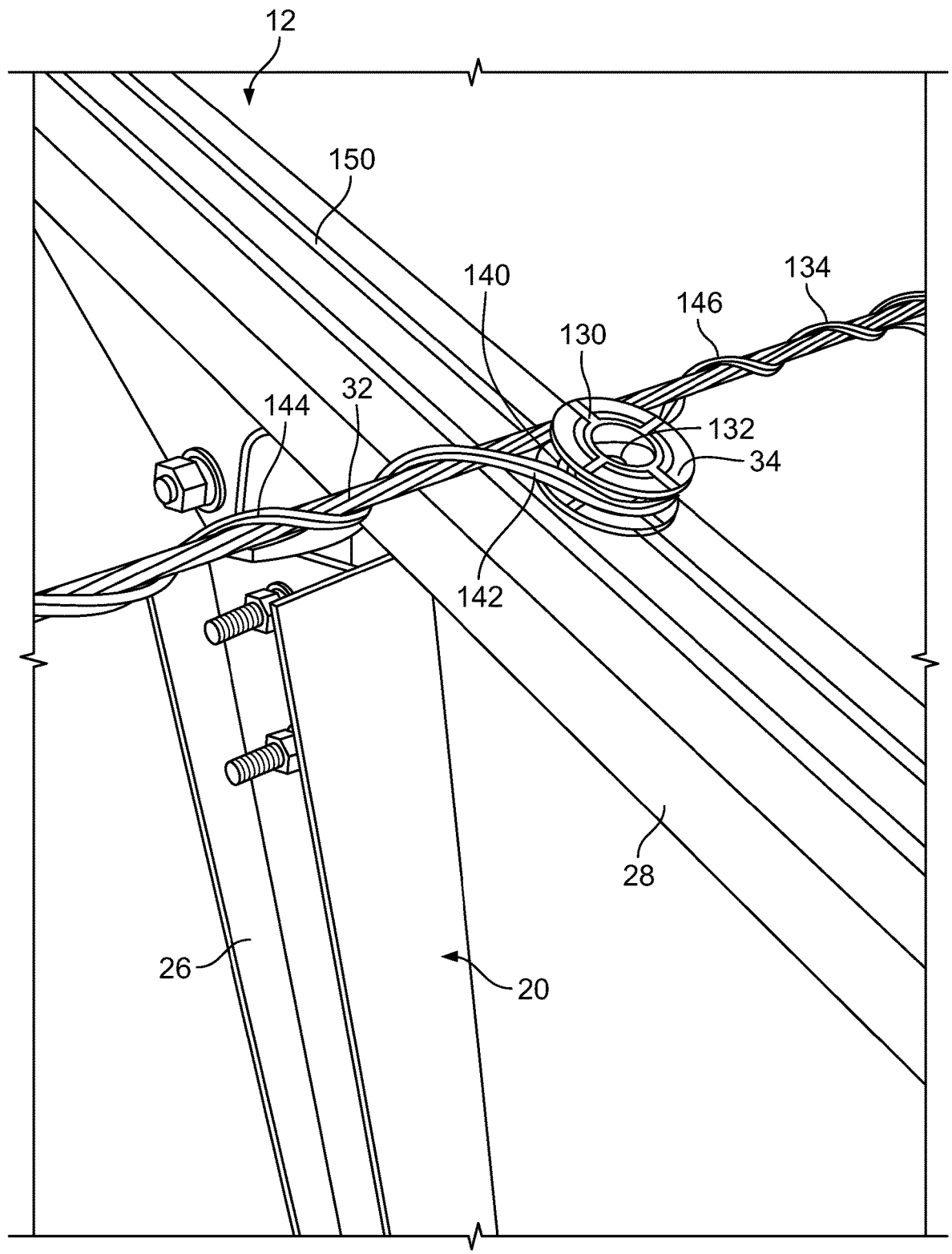
FIG. 8 is a photograph of an example portion of an example mounting system, such as the example mounting system shown in FIG. 1A or 1C, and an example mounting structure for attachment between a cable and a stanchion.

It is to be appreciated that connection of the photovoltaic panel(s) 14 to the cable(s) 32 may be one portion of the photovoltaic panel mounting system 12 within the photovoltaic panel array arrangement 10. Another portion of photovoltaic panel mounting system 12 may be the connection of the cable(s) 32 to the stanchions 20. Recall that the photovoltaic panel mounting structures 34 are for attachment between a cable 32 and a stanchion 20 (e.g., attachment of cable to stanchion). FIG. 8 shows one example of the photovoltaic panel mounting structures 34.

It is to be noted that the stanchion 20 shown within the example of FIG. 8 has some structural features on the transverse member 28 for the shown example photovoltaic panel mounting structure 34. For example, note that the transverse member 28 has at least one slot 150 extending along at least a portion of the length of the transverse member 28. The slot 150 allows access to a hollow interior portion of the transverse member 28. So, the transverse member 28 of this example is a rail.

Turing now to the example photovoltaic panel mounting structure 34, such example is similar, and could be identical, in construction to the photovoltaic panel mounting structure 38 shown within FIG. 7. Accordingly, for brevity, the reference numerals utilized to describe the photovoltaic panel mounting structure 38 of FIG. 7 are also used within FIG. 8 for the example photovoltaic panel mounting structure 34 for the same/similar structures. Of course, it is to be appreciated that difference(s)/variation(s) are possible, contemplated and within the scope of this disclosure.

The slot 150 in the transverse member 28 allows the fastener arrangement 132 to extend through the slot 150 and into the interior portion. Such allows the fastener arrangement 132 to fix/secure the photovoltaic panel mounting structure 34, and thus the cable 32, relative to the transverse member 28 of the stanchion 20. It is to be noted that elongation of the slot 150 of the transverse member 28 allows the fastener arrangement 132 to be moved along the transverse member 28 (i.e., the rail). Such allows the photovoltaic panel mounting structure 34, and thus the cable 32, to be adjusted relative to the transverse member 28 of the stanchion 20. The adjustment is along the elongation of the transverse member 28. It is to be noted that for photovoltaic panels 14 that are arranged in multi-row arrays, such as shown within FIGS. 1A and 1B, the adjustment can be considered to provide for adjustment of one photovoltaic panel 14 relative to another one photovoltaic panel 14 (e.g., generally "up/down" adjustment in the reference frame of FIG. 1A or 1B).

Figure 9:
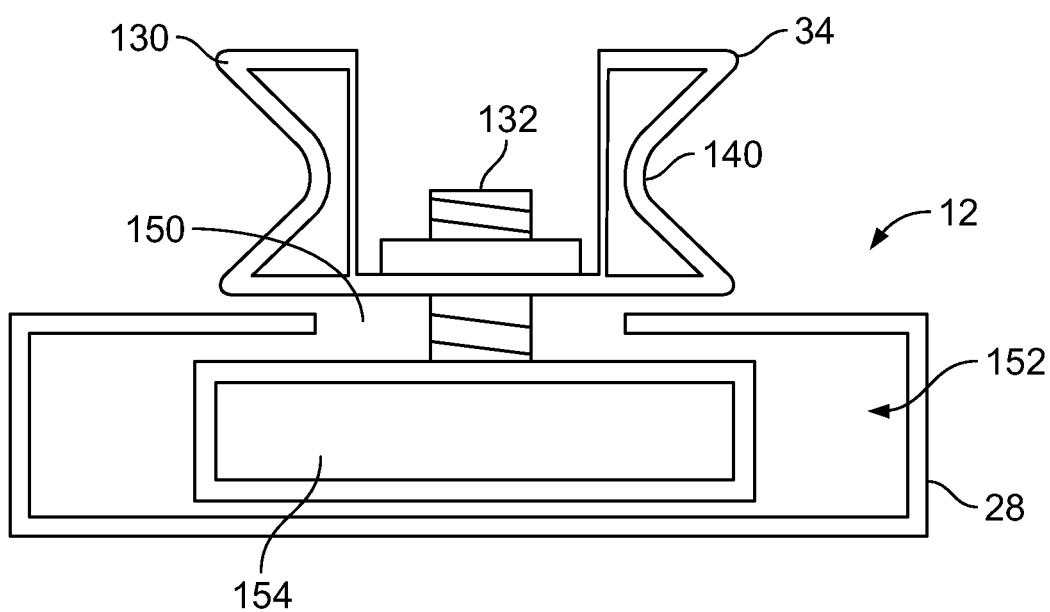
FIG. 9 is a schematic section view illustration of the example mounting structure and stanchion of FIG. 8.

In order to provide an explanatory example of interaction between the photovoltaic panel mounting structure 34 and the transverse member 28, attention is directed to FIG. 9. It is to be noted that FIG. 9 is a schematic cross-section view that shows an example hollow interior portion 152 of the transverse member 28. The fastener arrangement 132 includes a portion 154 (e.g., a threaded puck or block) located within the hollow interior portion 152. Tightening the fastener arrangement 132 clamps portions of the transverse member 28 adjacent to the slot 150 between the bobbin-like member 130 and the portion 154 to fix the photovoltaic panel mounting structure 34 relative to the transverse member 28. Of course, prior to such tightening/clamping, the photovoltaic panel mounting structure 34 may be moved (e.g., via a sliding motion) along the slot (e.g., into and out of the plane of FIG. 9).

It is to be appreciated that FIG. 9 is schematic and shows just a single slot 150 and a single hollow interior portion 152. It is to be appreciated that the transverse member 28 may have more than one slot 150 (e.g., see FIG. 8). Also, the transverse member 28 may have more than one hollow interior portion.

Figure 10:
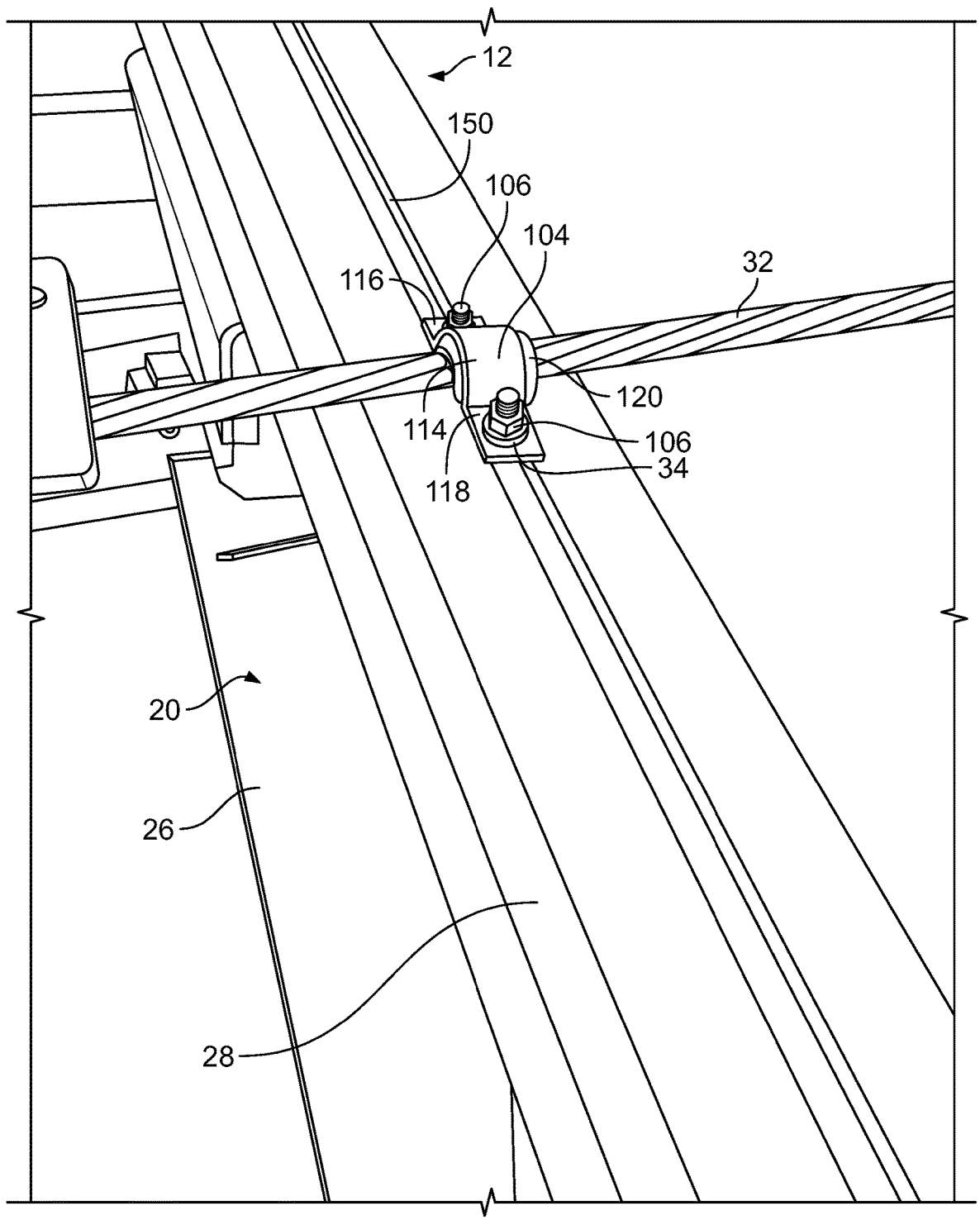
FIG. 10 is a photograph of another example portion of another example mounting system, such as the example mounting system shown in FIG. 1A or 1C, and an example mounting structure for attachment between a cable and a stanchion.

It is to be appreciated that FIGS. 8 and 9 shown an example of the photovoltaic panel mounting structure 34 and that other examples of the photovoltaic panel mounting structure 34 are contemplated and within the scope of the present disclosure. FIG. 10 shows another example photovoltaic panel mounting structure 34.

It is worth noting that the example photovoltaic panel mounting structure 34 of FIG. 10 has some structure(s) that is similar, and could be identical, in construction to a portion of the photovoltaic panel mounting structure 38 shown within FIGS. 5 and 6. Accordingly, for brevity, the reference numerals utilized to describe the portion of photovoltaic panel mounting structure 38 of FIGS. 5 and 6 are also used within FIG. 10 for the example photovoltaic panel mounting structure 34 for the same/similar structures. Of course, it is to be appreciated that difference(s)/variation(s) are possible, contemplated and within the scope of this disclosure.

For the example of FIG. 10, the photovoltaic panel mounting structure 34 is adjustably attached to one of the cables 32 and adjustably attached to the transverse member 28 of one of the stanchions 20. As such, the cable 32 is attached to the stanchion 20 by the photovoltaic panel mounting structure 38 at a first cable location of the cable.

The example clamp member 104 has a central arc portion 114 and two wing-like extensions 116, 118. Each wing-like extension 116, 118 has a respective through-bore. The example clamp member 104 also includes an optional resilient liner 120 located within the central arc portion 114. The resilient liner120 may have a generally cylindrical shape, with a split along one side of the cylinder shape.

Note that the clamp member 104 of the example photovoltaic panel mounting structure 34 is located relative to the cable 32 such that the cable 32 is located within central arc portion 114. Further, the cable 32 is located within the resilient liner 120. It is to be noted that the split along one side of the cylinder shape may allow easy placement of the resilient liner120 at any location along the length of the cable 32.

Within the shown example, a fastener arrangement 106 includes two bolt and nut combinations. The fastener arrangement 106 (e.g., the mentioned bolts and associated nuts) extend through the through-bores. Similar to the example of FIGS. 8 and 9, the fastener arrangement 106 extends through the slot 150 in the transverse member 28 and into a hollow interior portion of the transverse member 28 of the stanchion 20. As such, the transverse member 28 is a rail in this example.

Such allows the fastener arrangement 106 to fix/secure the photovoltaic panel mounting structure 34, and thus the cable 32, relative to the transverse member 28 of the stanchion 20. It is to be noted that elongation of the slot 150 of the transverse member 28 allows the fastener arrangement 106 to be moved along the transverse member 28. Such allows the photovoltaic panel mounting structure 34, and thus the cable 32, to be adjusted relative to the transverse member 28 of the stanchion 20. The adjustment is along the elongation of the transverse member 28. Tightening of the fastener arrangement 106 (e.g., the mentioned bolts and associated nuts) retains and holds the cable relative to the clamp member 104, and thus the example photovoltaic panel mounting structure 38 and the transverse member 28.

Figure 11:
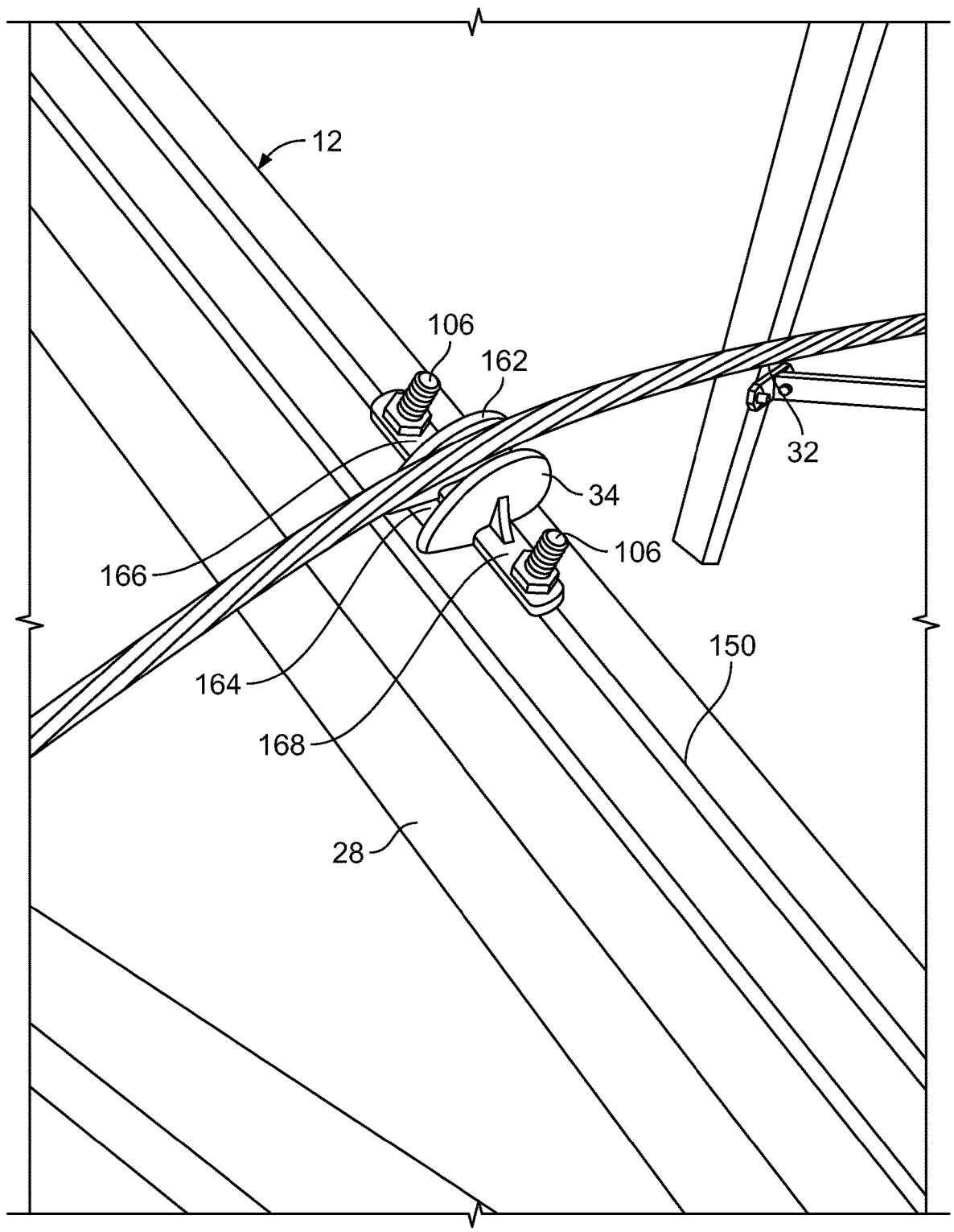
FIG. 11 is a photograph of another example portion of another example mounting system, such as the example mounting system shown in FIG. 1A or 1C, and an example mounting structure for attachment between a cable and a stanchion.

Another example photovoltaic panel mounting structure 34 of a photovoltaic panel mounting system 12 for connection of the cable 32 to the stanchion 20 is shown in FIG. 11.

It is worth noting that the example photovoltaic panel mounting structure 34 of FIG. 11 has some structure(s) that is similar, and could be identical, in construction to the photovoltaic panel mounting structure 34 shown within FIG. 10. Accordingly, for brevity, the reference numerals utilized to describe the photovoltaic panel mounting structure 34 of FIG. 10 are also used within FIG. 11 for the example photovoltaic panel mounting structure 34 for the same/similar structures. Of course, it is to be appreciated that difference(s)/variation(s) are possible, contemplated and within the scope of this disclosure.

For the example of FIG. 10, the photovoltaic panel mounting structure 34 is adjustably attached to the transverse member 28 of one of the stanchions 20. The photovoltaic panel mounting structure 34 also adjustably supports one of the cables 32. As such, the cable 32 is supported relative to the stanchion 20 by the photovoltaic panel mounting structure 38 at a first cable location of the cable.

The photovoltaic panel mounting structure 34 has a half bobbin-like central portion 162 with an exterior half spool recess 164 extending about the periphery of the bobbin-like central portion 162. Note that the cable 32 is located within the exterior half spool recess 164 of the bobbin-like central portion 162. Wing-like extensions 166, 168 extend from the bobbin-like member 46 in directions generally perpendicular to the extent of the exterior half spool recess 164 of the bobbin-like member 46. Each Wing-like extension 60, 62 has a respective through-hole (not visible in FIG. 11). The material for such may be a polymeric material.

Within the shown example, a fastener arrangement 106 includes two bolt and nut combinations. The fastener arrangement 106 (e.g., the mentioned bolts and associated nuts) extend through the through-bores. Similar to the examples of FIGS. 8 and 10, the fastener arrangement 106 extends through the slot 150 in the transverse member 28 and into a hollow interior portion of the transverse member 28 of the stanchion 20. As such, the transverse member 28 is a rail in this example. The material for the fastener arrangement 106 may be a metal.

Such allows the fastener arrangement 106 to fix/secure the photovoltaic panel mounting structure 34, and thus the cable 32, relative to the transverse member 28 of the stanchion 20. It is to be noted that elongation of the slot 150 of the transverse member 28 allows the fastener arrangement 106 to be moved along the transverse member 28. Such allows the photovoltaic panel mounting structure 34, and thus the cable 32, to be adjusted relative to the transverse member 28 of the stanchion 20. The adjustment is along the elongation of the transverse member 28. Tightening of the fastener arrangement 106 (e.g., the mentioned bolts and associated nuts) retains the example photovoltaic panel mounting structure 38 relative to the transverse member 28 and thus hold the cable 32 relative thereto.

Figure 12A:
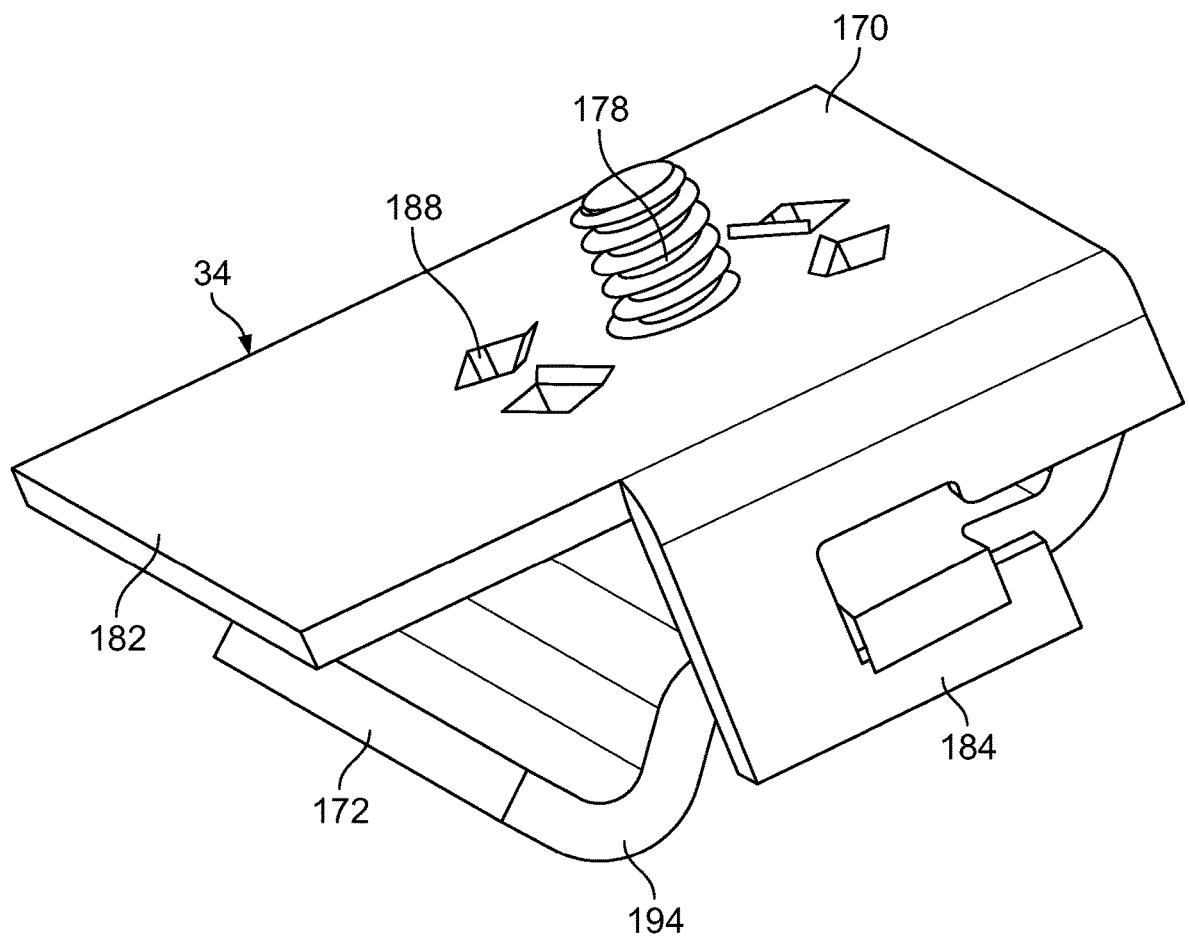
FIG. 12A is a perspective view illustration of another example portion of an example mounting structure.
Figure 12B:
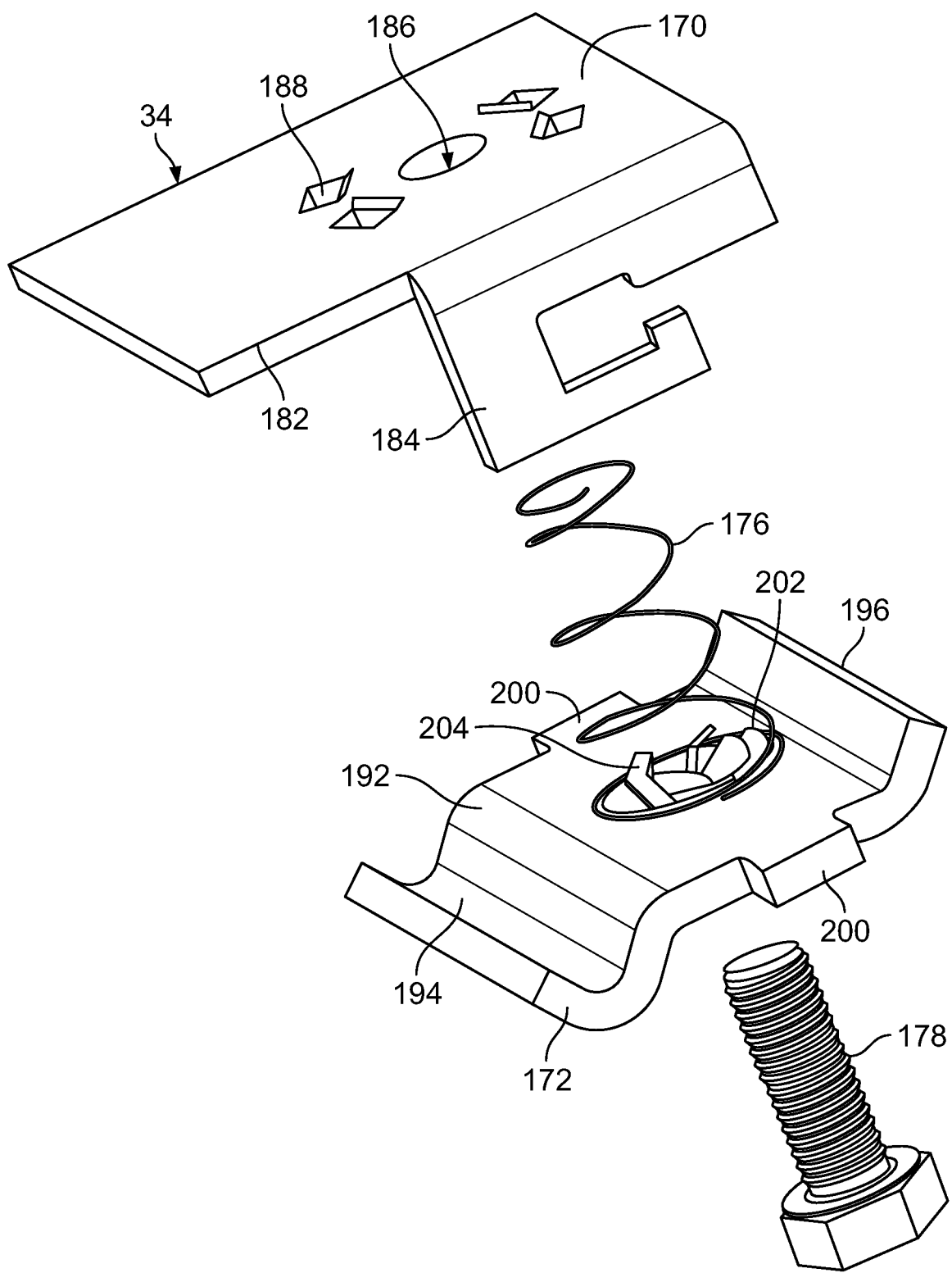
FIG. 12B is an exploded view illustration of the example mounting structure of FIG. 12A.

It is to be appreciated that still other examples of photovoltaic panel mounting structure 34 for use in the photovoltaic panel mounting system 12 (see FIGS. 1A-1C) for connection of the cable(s) 32 to the stanchion(s) 20 are within the scope of the present disclosure. FIGS. 12A and 12B show such as example. The example photovoltaic panel mounting structure 34 includes a first bracket portion 170, a second bracket portion 172, a helical bias spring 176 and a fastener arrangement 178. The material for all of such may be metal.

The first bracket portion 170 includes a flat portion 182 and two ear retainer portions 184 (only one shown) located on opposite sides of the flat portion 182. Each ear retainer portion 184 provides a receptacle aperture. A hole 186 extends through the flat portion 182 and a plurality of embossments 188 are on the flat portion 182.

The second bracket portion 172 has a main portion 192 that is bent to have undulations 194, 196. Two ears 200 extend from the main portion 192 on opposite sides. A hole 202, typically non-threaded, extends through the main portion 192 and a plurality of embossments 204 are on the main portion 192.

The bias spring 176 is located between the first bracket portion 170 and the second bracket portion 172 and provides a bias force that urges the first bracket portion 170 and the second bracket portion 172 apart. The bias spring 176 engages against the plurality of embossments 188 and 204 of the first bracket portion 170 and the second bracket portion 172, respectively, to help retain the bias spring 176 between the first bracket portion 170 and the second bracket portion 172. The fastener arrangement 178, which may include a threaded bolt, extends through the hole 202 and the hole 186. As will be discussed following a tightening actuation of the fastener arrangement 178 moves the first bracket portion 170 and the second bracket portion 172 closer together to provide a pressing force.

Figure 13A:
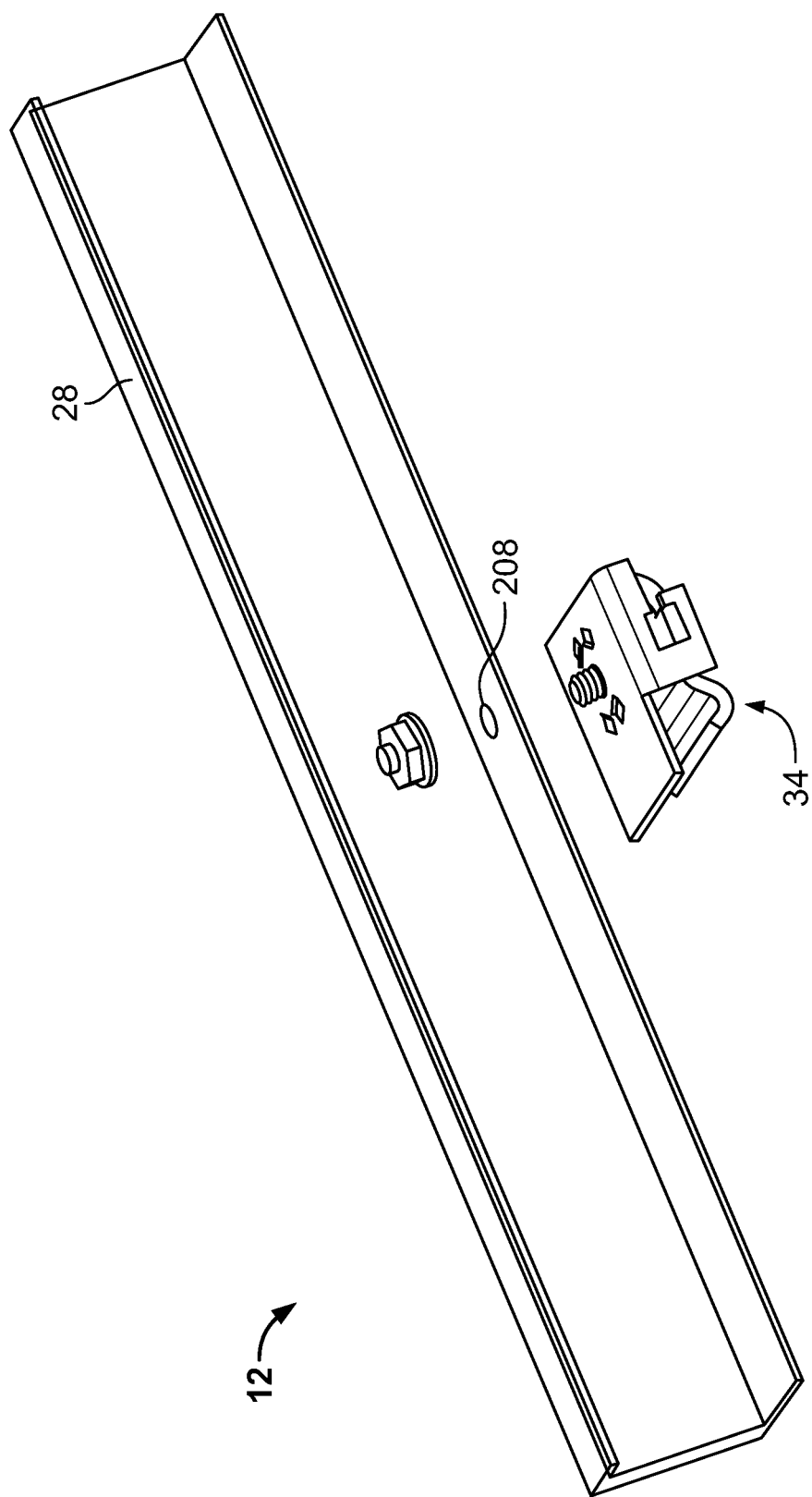
FIG. 13A another example portion of another example mounting system, such as the example mounting system shown in FIG. 1A or 1C, and showing the example mounting structure of FIGS. 12A and 12B.

Turning attention of FIG. 13A, note that the photovoltaic panel mounting structure 34 is located adjacent another portion of the photovoltaic panel mounting system 12. Within one example, the other portion of the photovoltaic panel mounting system 12 is the transverse member 28 of a stanchion 20. Note that the transverse member 28 includes a hole 208. The threaded bolt of the fastener arrangement 178 extends through the hole, with a nut of the fastener arrangement 178 engaging the threaded bolt. Upon the tightening of the fastener arrangement 178, the photovoltaic panel mounting structure 34 can be securely fixed relative to the transverse member 28.

Figure 13B:
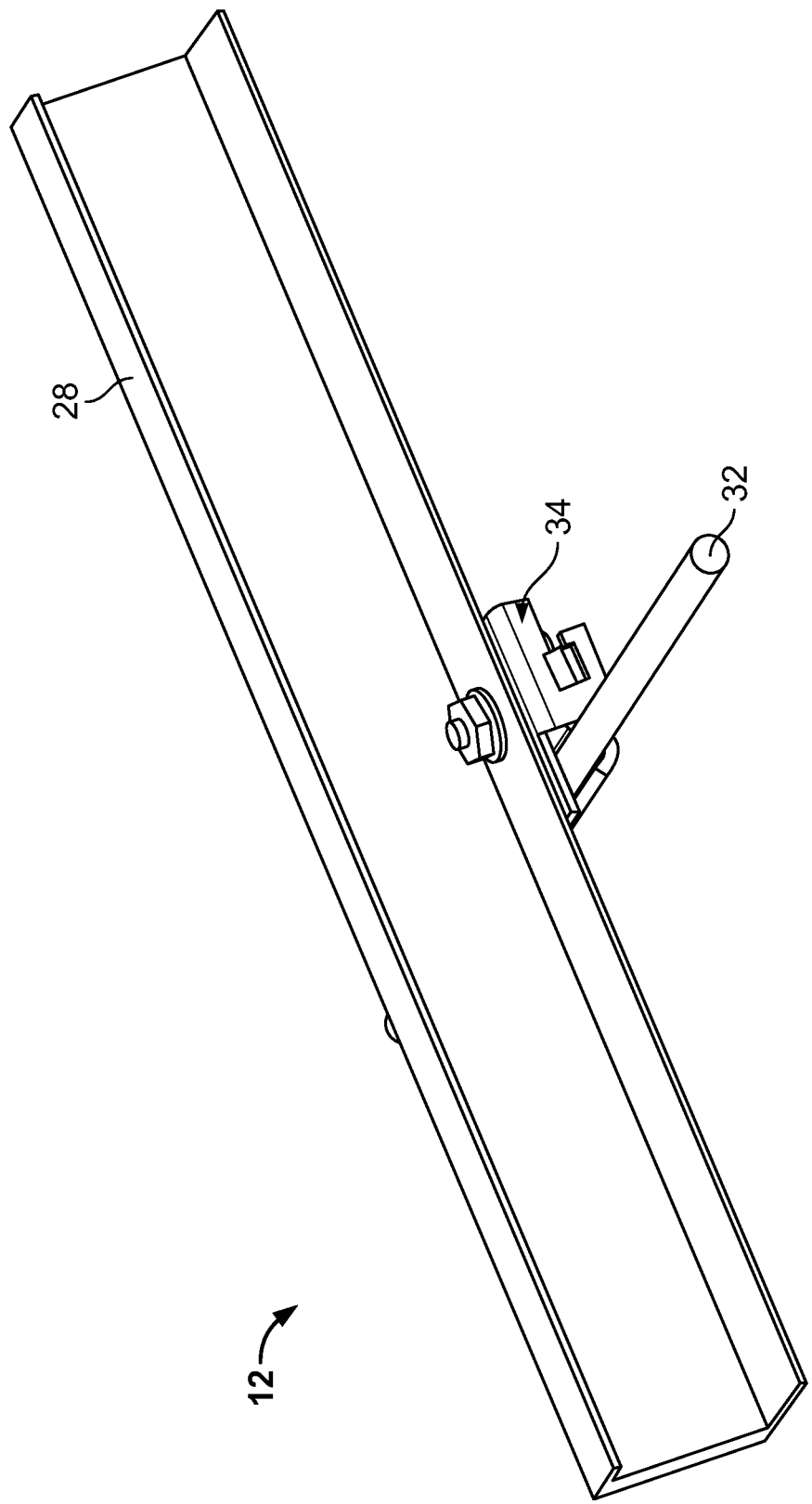
FIG. 13B is an illustration similar to FIG. 13A, but shows the example mounting structure in secured attachment to an example stanchion and to an example cable.

It is to be noted that the undulation 194 (see FIGS. 12A and 12B) of the second bracket portion 172 provides a space for receiving the cable 32 (see FIG. 13B). As such, when the fastener arrangement 178 with the cable 32 located within the undulation 194, the cable 32 is gripped and held by the photovoltaic panel mounting structure 34 (i.e., between the first bracket portion 170 and the second bracket portion 172). Accordingly, the cable 32 is fixed relative to the photovoltaic panel mounting structure 34 and thus fixed relative to the transverse member 28.

Of course, the shown positions in FIGS. 13A and 13B, including relative positions, are only one example. The positions may be different. For example, the photovoltaic panel mounting structure 34 and thus the cable 32 may be located above the transverse member 28.

Figure 14:
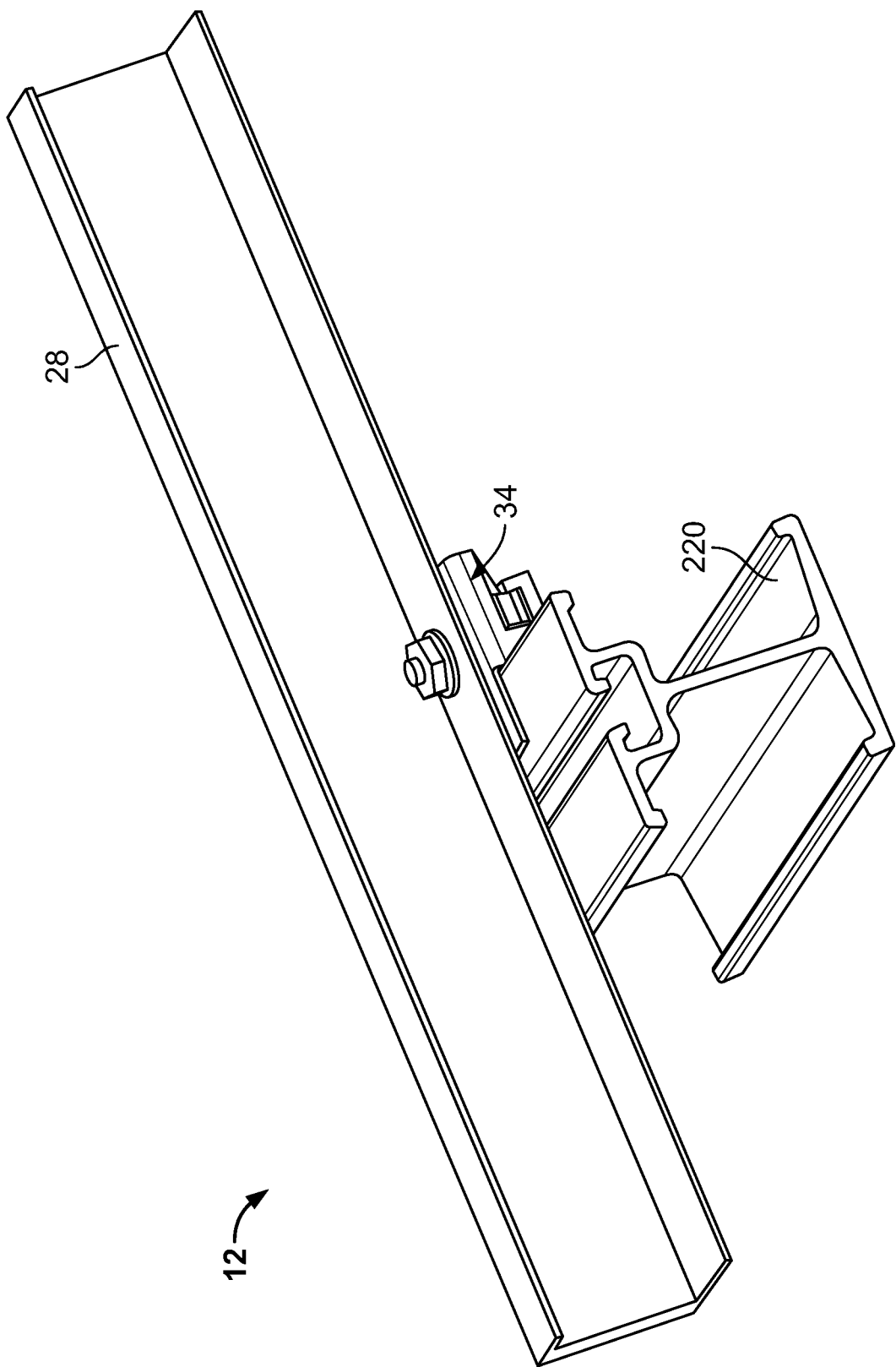
FIG. 14 an illustration of another example portion of another example mounting system, and an example mounting structure for attachment between another mounting system portion, such as a rigid portion, and a stanchion, and showing versatility of usability of the example mounting structures presented herein.

It is to be appreciated that the example photovoltaic panel mounting structure 34 as shown in FIGS. 12A and 12B could be used to secure/fix other parts/portions. For example, FIG. 14 shows the example photovoltaic panel mounting structure 34 as shown in FIGS. 12A and 12B connecting two parts/portions other than the cable 32 (as was shown in FIG. 13B). Such other parts/portions may both be rigid, as compared to a cable which may be considered has having a noted amount of flexibility when not taut. Such other parts/portions may be a stanchion and some other rigid portion 220.

The system(s) herein provide a number of benefits. For example, due to the adjustability and/or movability of the photovoltaic panels relative to the mounting base(s), the photovoltaic panels can be oriented and/or moved so as to accommodate for surface structures on the surface 16, such as vents, air conditioners, etc. In an example, the photovoltaic panels can also be adjusted to reduce or increase the spacing between adjacent photovoltaic panels. Further, the module mounts can be interchanged and/or replaced so as to adjust the angles of the photovoltaic panels.

Of course, methods of making the photovoltaic panel array arrangement (e.g., 10) and/or the mount system (e.g., 12), and portions thereof, and methods of utilizing the photovoltaic panel array arrangement and/or the mount system, and portions thereof, are contemplated and within the scope of the present disclosure.

The example claims following present various example aspects. The contents of the claims are incorporated herein at into this specification by reference.

The accompanying drawings present various example aspects. The contents of the drawings are incorporated herein at into this specification by reference.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes," "having," "has," "with," and/or variants thereof are used in either the detailed description or the claims, such terms are intended to be inclusive in a manner similar to the term "comprising."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed:

1. A photovoltaic panel mounting system, comprising:
a mounting structure comprising:
an attachment portion configured to be adjustably positioned relative to a first photovoltaic panel and configured to be fixedly attached to the first photovoltaic panel subsequent to the adjustable positioning of the attachment portion, wherein the adjustable positioning and fixed attachment of the attachment portion to the first photovoltaic panel is configured to provide for an adjustable distance between the first photovoltaic panel and a second photovoltaic panel; and
a cable attachment portion configured to be adjustably positioned relative to a cable and configured to be fixedly attached to the cable subsequent to the adjustable positioning of the cable attachment portion to couple the first photovoltaic panel to the cable.

2. The photovoltaic panel mounting system of claim 1, wherein the attachment portion is a first attachment portion, the mounting structure comprising a second attachment portion configured to be adjustably positioned relative to the second photovoltaic panel and configured to be fixedly attached to the second photovoltaic panel subsequent to the adjustable positioning of the second attachment portion.

3. The photovoltaic panel mounting system of claim 2, wherein the adjustable positioning of the second attachment portion to the second photovoltaic panel is configured to provide for the adjustable distance between the first photovoltaic panel and the second photovoltaic panel.

4. The photovoltaic panel mounting system of claim 1, the mounting structure comprises an attachment plate configured to be adjustably positioned and subsequently fixedly attached to the first photovoltaic panel.

5. The photovoltaic panel mounting system of claim 4, the attachment plate defining a first opening for receiving a fastener, the first opening having an elongated shape.

6. The photovoltaic panel mounting system of claim 5, wherein the fastener is configured to be received within the first opening and within a first panel opening defined by the first photovoltaic panel to attach the mounting structure to the first photovoltaic panel.

7. The photovoltaic panel mounting system of claim 1, the cable attachment portion defining a recess for receiving the cable.

8. The photovoltaic panel mounting system of claim 7, wherein when the cable is received within the recess, a first surface of the cable is bordered by the cable attachment portion and a second surface of the cable is not bordered by the cable attachment portion.

9. The photovoltaic panel mounting system of claim 1, wherein the mounting structure is a first mounting structure, the system further comprising:
a second mounting structure configured to be attached to a stanchion and the cable to couple the first photovoltaic panel to the stanchion through the cable.

10. A photovoltaic panel mounting system, comprising:
a first mounting structure having a first surface and a second surface, the first surface configured to be attached to a first photovoltaic panel, the second surface configured to be attached to a cable; and
a second mounting structure having a first mounting portion and a second mounting portion, the first mounting portion configured to be attached to the cable, the second mounting portion configured to be received within an elongated opening of a rail of a stanchion, the rail extending between a first end and a second end, the second mounting structure movable within the elongated opening such that a distance between the second mounting structure and the first end of the rail is adjustable.

11. The photovoltaic panel mounting system of claim 10, wherein when the first mounting structure and the second mounting structure are attached to the cable, the first photovoltaic panel overlies the stanchion.

12. The photovoltaic panel mounting system of claim 10, wherein the first mounting structure is attached to the cable at a first cable location of the cable and the second mounting structure is attached to the cable at a second cable location of the cable.

13. The photovoltaic panel mounting system of claim 12, comprising a third mounting structure having a third surface and a fourth surface, the third surface configured to be attached to a second photovoltaic panel, the fourth surface configured to be attached to the cable.

14. The photovoltaic panel mounting system of claim 13, wherein the third mounting structure is attached to the cable at a third cable location of the cable.

15. A photovoltaic panel mounting system, comprising:
a first mounting structure defining a first opening for receiving a fastener, the fastener configured to be received within the first opening and within a first panel opening defined by a first photovoltaic panel to attach the first mounting structure to the first photovoltaic panel, the first mounting structure defining a recess for receiving a cable; and
a second mounting structure configured to be attached to a stanchion, the second mounting structure defining a second recess for receiving the cable, wherein when the cable is received within the recess of the first mounting structure and the second recess of the second mounting structure, the first photovoltaic panel is attached to the stanchion.

16. The photovoltaic panel mounting system of claim 15, the first mounting structure defining a second opening for receiving a second fastener, the second fastener configured to be received within the second opening and within a second panel opening defined by a second photovoltaic panel to attach the first mounting structure to the second photovoltaic panel.

17. The photovoltaic panel mounting system of claim 16, wherein at least one of the first opening or the second opening are elongated such that a position of the first mounting structure relative to at least one of the fastener or the second fastener is adjustable.

18. The photovoltaic panel mounting system of claim 15, wherein the second mounting structure is configured to be received within an elongated opening of a rail of the stanchion, the rail extending between a first end and a second end, the second mounting structure movable within the elongated opening such that a distance between the second mounting structure and the first end of the rail is adjustable.

19. The photovoltaic panel mounting system of claim 15, wherein when the cable is received within the recess, a first surface of the cable is bordered by the first mounting structure and a second surface of the cable is not bordered by the first mounting structure.

20. The photovoltaic panel mounting system of claim 15, comprising:
   a wire configured to wrap around the cable and a surface of the first mounting structure not interfacing with the cable to attach the cable to the first mounting structure.

* * * * *